(12) United States Patent
Fukuda

(10) Patent No.: US 10,642,553 B2
(45) Date of Patent: May 5, 2020

(54) IMAGE FORMING APPARATUS, INFORMATION PROCESSING TERMINAL, AND COMPUTER READABLE STORAGE MEDIUM

(71) Applicant: CANON KABUSHIKI KAISHA, Tokyo (JP)

(72) Inventor: Shin Fukuda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/238,018

(22) Filed: Jan. 2, 2019

(65) Prior Publication Data
US 2019/0212952 A1 Jul. 11, 2019

(30) Foreign Application Priority Data
Jan. 10, 2018 (JP) ................. 2018-001986

(51) Int. Cl.
*G06F 3/12* (2006.01)
*H04N 1/00* (2006.01)
*H04N 1/32* (2006.01)

(52) U.S. Cl.
CPC ............ *G06F 3/126* (2013.01); *G06F 3/1211* (2013.01); *H04N 1/00411* (2013.01); *H04N 1/32101* (2013.01); *H04N 2201/0094* (2013.01); *H04N 2201/3205* (2013.01)

(58) Field of Classification Search
CPC ... G06F 3/126; G06F 3/1211; H04N 1/32101; H04N 1/00411; H04N 2201/3205; H04N 2201/0094
USPC ........................................................ 358/1.15
See application file for complete search history.

(56) References Cited

U.S. PATENT DOCUMENTS

2014/0270396 A1* 9/2014 Miyagawa ......... H04N 1/00005
 382/112
2016/0044194 A1* 2/2016 Wakana ............. H04N 1/00631
 358/1.12

FOREIGN PATENT DOCUMENTS

JP 2013-146898 A 8/2013

* cited by examiner

*Primary Examiner* — Tammy Paige Goodard
*Assistant Examiner* — Darryl V Dottin
(74) *Attorney, Agent, or Firm* — Venable LLP

(57) ABSTRACT

Provided is an image forming apparatus for allowing easy recognition of an image forming job corresponding to a sheet bundle on a sheet discharge tray. An image region in which an entire configuration of the image forming apparatus and a sheet discharge apparatus is displayed and a list region in which processed image forming jobs are listed are displayed on a monitor screen of the image forming apparatus. In the image region, sheet images corresponding to processed jobs are mapped at corresponding positions of the sheet discharge trays. When a sheet image is designated by a cursor, a processed job corresponding to a cursor position is identified, and a corresponding sheet image is displayed in an emphasized manner with a color different from that for other sheet images.

11 Claims, 20 Drawing Sheets

| PROCESSED-JOB LIST | | | | | | |
|---|---|---|---|---|---|---|
| JOB ID | JOB NAME | PROCESSING DAY/TIME | NUMBER OF PAGES | NUMBER OF BUNDLES | USED SHEET | |
| 00000001 | IMAGE FORMING JOB #1 | 2011/08/13 13:52:21 JST | 5 | 100 | ABC PAPER C081 | |
| 00000002 | IMAGE FORMING JOB #2 | 2011/08/13 14:09:02 JST | 20 | 5 | ABC PAPER C082 | |
| 00000003 | IMAGE FORMING JOB #3 | 2011/08/21 09:11:43 JST | 20 | 30 | ABC PAPER C081 | |
| 00000004 | IMAGE FORMING JOB #4 | 2011/08/22 10:34:28 JST | 60 | 500 | DEF PAPER/PLAIN PAPER | |
| 00000005 | IMAGE FORMING JOB #5 | 2011/08/22 16:46:27 JST | 100 | 1 | XYZ PAPER/PLAIN PAPER | |

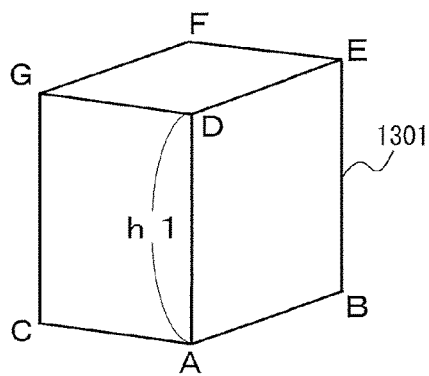

FIG. 13B

| | COORDINATE POSITION | 1302 |
|---|---|---|
| A | TRAY POSITION COORDINATES (x, y) | |
| B | x+33 , y-13 | |
| C | x-35 , y-5 | |
| D | x, y-h1 | |
| E | x+33 , y-h1-13 | |
| F | x-5 , y-h1-17 | |
| G | x-35 , y-h1-5 | |

FIG. 13C

```
<path stroke="black" stroke-width="1" fill="white" fill-opacity="0.7" d="M x (y-h1) L (x+33) (y-h1-13) L (x-5) (y-h1-17) L (x-35) (y-h1-5) Z"/>
<path stroke="black" stroke-width="1" fill="white" fill-opacity="0.7" d="M x (y-h1) L (x-35) (y-h1-5) L (x-35) (y-5) L x y Z"/>
<path stroke="black" stroke-width="1" fill="white" fill-opacity="0.7" d="M x (y-h1) L x y L (x+33) (y-13) L (x+33) (y-h1-13) Z"/>
```

1303

| | COORDINATE POSITION | 1502 |
|---|---|---|
| A | TRAY POSITION COORDINATES (x, y) | |
| P | Px, Py | |

| | | 1503 |
|---|---|---|
| r | (y-Py)-13(Px-x)/33 | |

FIG. 17A

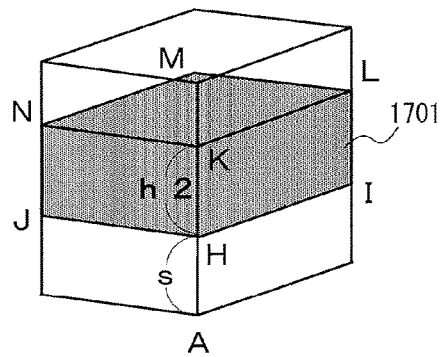

FIG. 17B

| | COORDINATE POSITION |
|---|---|
| A | TRAY POSITION COORDINATES (x, y) |
| H | x , y-s |
| I | x+33 , y-s-13 |
| J | x-35 , y-s-5 |
| K | x, y-s-h2 |
| L | x+33 , y-s-h2-13 |
| M | x-5 , y-s-h2-17 |
| N | x-35 , y-s-h2-5 |

FIG. 17C

```
<path stroke="black" stroke-width="1" fill="gray" fill-opacity="0.7" d="M x (y-s-h2) L (x+33) (y-s-h2-13) L (x-5) (y-s-h2-17) L (x-35) (y-s-h2-5) Z"/>
<path stroke="black" stroke-width="1" fill="gray" fill-opacity="0.7" d="M x (y-s-h2) L (x-35) (y-s-h2-5) L (x-35) (y-s-5) L x (y-s) Z"/>
<path stroke="black" stroke-width="1" fill="gray" fill-opacity="0.7" d="M x (y-s-h2) L x (y-s) L (x+33) (y-s-13) L (x+33) (y-s-h2-13) Z"/>
```

IMAGE FORMING APPARATUS, INFORMATION PROCESSING TERMINAL, AND COMPUTER READABLE STORAGE MEDIUM

BACKGROUND OF THE INVENTION

Field of the Invention

The present disclosure relates to an image forming apparatus to which a plurality of sheet discharge apparatus are mountable, and also relates to an information processing terminal and a computer readable storage medium.

Description of the Related Art

There are known service forms for image formation called print on demand (POD) and production printing. In such service forms, for example, small-lot and large-variety printing orders are received from customers. Then, the orders are printed quickly using an image forming apparatus operated at high speed to be delivered. At this time, images are rapidly formed onto a large amount of sheets (sheet-like media, the same applies in the following), and the sheets are discharged. A large-capacity stacker is prepared at a sheet discharge destination.

The large-capacity stacker of this type stacks several thousands of sheets at one time. A plurality of large-capacity stackers may be connected so that, even when one large-capacity stacker is full, image formation can be continued by automatically switching a sheet discharge destination to another large-capacity stacker. In this case, sheets having images formed thereon and corresponding to the same image forming job are discharged to a plurality of locations in a divided manner. In the following description, the "sheet having an image formed thereon" is simply referred to as "sheet" in some cases.

Meanwhile, an operator performs work of collecting the discharged sheets to proceed to the next step. However, it is not easy to identify a position of a sheet corresponding to a predetermined image forming job from a large amount of sheets discharged to a plurality of locations. In order to address this issue, in the technology described in Japanese Patent Application Laid-open No. 2013-146898, the image forming apparatus receives a request for checking the sheet discharge destination for each image forming job. Then, an apparatus being the sheet discharge destination (sheet discharge apparatus such as the large-capacity stacker) is displayed on a predetermined display device. In this manner, the operator can check the sheet discharge destination corresponding to each image forming job, and reliably collect the sheets corresponding to a processed job.

In the technology disclosed in Japanese Patent Application Laid-open No. 2013-146898, the display device displays a stacking state of sheets corresponding to the image forming job selected by the operator. However, in some cases, rather than the sheet stacking state, which image forming job the stacked sheets correspond to may be more desired to be checked.

For example, when a user or the operator collects the stacked sheets to perform predetermined post-processing, the user or the operator may be required to check "whether the sheet corresponds to an intended image forming job" or "whether a sheet corresponding to an unintended image forming job is mixed". When such states can be checked, operation errors in the post-processing step can be suppressed. However, no disclosure corresponding to such demand is made in the technology disclosed in Japanese Patent Application Laid-open No. 2013-146898.

SUMMARY OF THE INVENTION

An image forming apparatus according to the present disclosure includes: an image forming unit configured to form an image on a sheet by executing an input image forming job; a plurality of sheet stacking units, on each of which sheets having images formed thereon are to be stacked; a memory configured to store first information representing a configuration of the plurality of sheet stacking units, and second information including information representing a correspondence between the sheets having the images formed thereon in each of the plurality of sheet stacking units and an image forming job executed for the sheets having the images formed thereon; and a controller configured to: generate a configuration image by visualizing the configuration based on the first information; generate a sheet image by visualizing a stacking state of the sheets having the images formed thereon in a corresponding one of the plurality of sheet stacking units that is identified based on the second information; display the configuration image and the sheet image on a display unit; detect input for designating the sheet image; identify the image forming job corresponding to the designated sheet image from the second information; and display the identified image forming job on the display unit.

Further features of the present invention will become apparent from the following description of exemplary embodiments (with reference to the attached drawings).

BRIEF DESCRIPTION OF THE DRAWINGS

FIG. 11 is a display example of a monitor screen.

FIG. 13A is an illustration of a sheet image, FIG. 13B is an illustration of a list, and FIG. 13C is an illustration of a rendering command using scalable vector graphics (SVG).

FIG. 17A is an illustration of a sheet image, FIG. 17B is an illustration of a list, and FIG. 17C is an illustration of a rendering command using SVG.

DESCRIPTION OF THE EMBODIMENTS

First Embodiment

Figure 1:
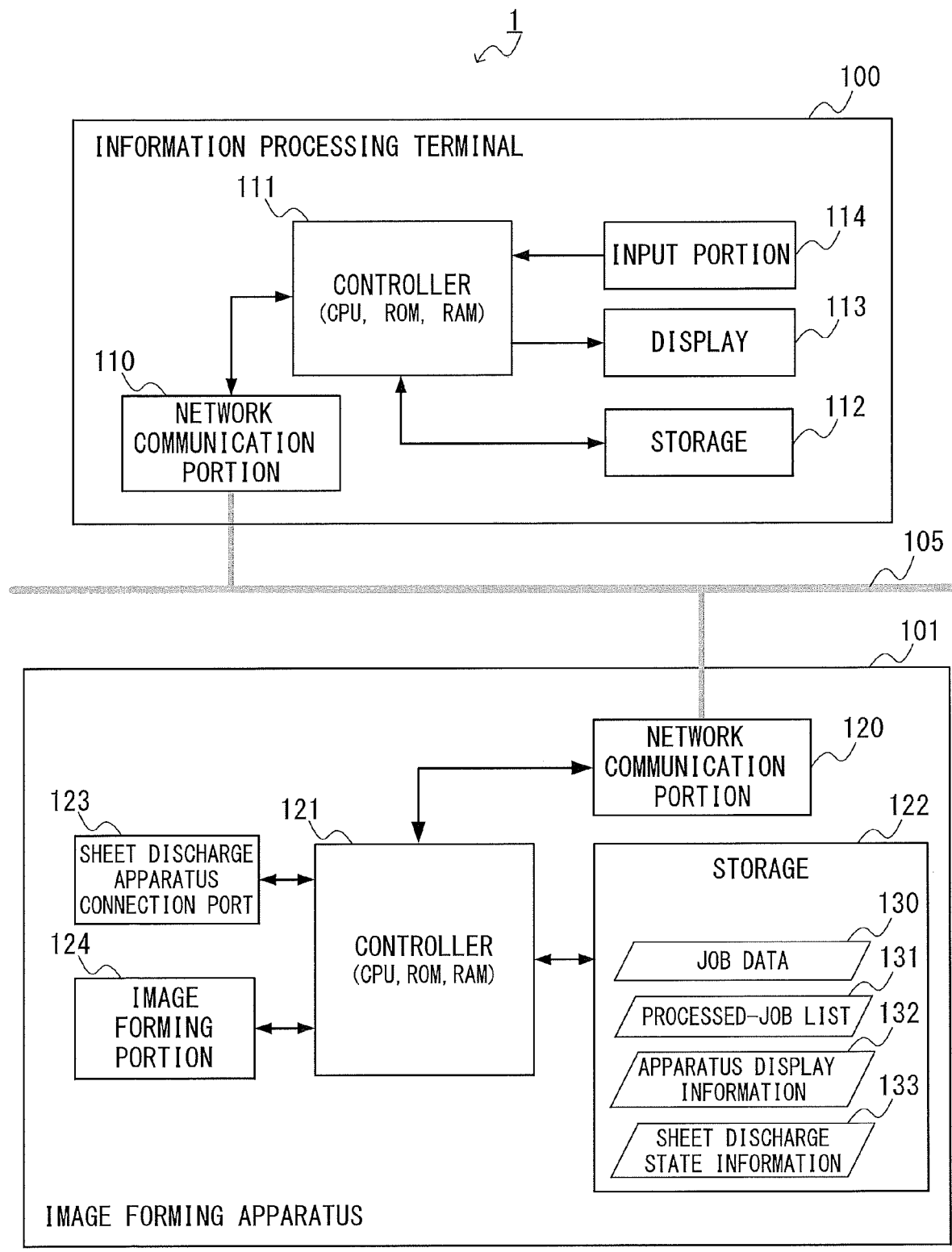
FIG. 1 is a configuration diagram of an image forming system.

FIG. 1 is a diagram for illustrating a schematic configuration example of an image forming system to which the present disclosure is applied. An image forming system 1 includes an information processing terminal 100 and an image forming apparatus 101, which are connected to a communication network 105. A first embodiment of the present disclosure represents an example in which one information processing terminal 100 and one image forming apparatus 101 are provided, but a plurality of information processing terminals 100 and a plurality of image forming apparatus 101 may be provided. The communication network 105 is a local area network (LAN). As the communication network 105, a wide area network (WAN), or a communication network that is a combination of the LAN and the WAN may be employed instead.

The information processing terminal 100 includes a communication control portion 110, a controller 111, a storage 112, a display 113, and an input portion 114. The communication control portion 110 is a communication unit configured to control the communication with the communication network 105. The storage 112 stores large-sized data in a short or long term. The display 113 is a display unit configured to display various types of display for an operator. In the first embodiment, the display 113 displays, for example, a configuration image and a sheet image to be described later. The input portion 114 receives various instructions from the operator, a range designation, input data, and designation of a processed job. The processed job refers to an image forming job for which image formation on the sheet has been finished as described later. When the display 113 is constructed of a touch panel, various instructions from the operator also can be input from the display 113. In the following embodiments, processing related to an operation of forming an image onto at least one sheet is referred to as "job".

The controller 111 is one type of computer including a central processing unit (CPU), a read only memory (ROM), and a random access memory (RAM). The CPU executes a computer program for terminal control to form various functions for the information processing terminal 100. This operation is described later. The ROM stores the above-mentioned computer program and the like. The RAM is a work memory for the CPU.

The image forming apparatus 101 includes a communication control portion 120, a controller 121, a storage 122, a sheet discharge apparatus connection port 123, and an image forming portion 124. The communication control portion 120 is a communication unit configured to control the communication performed with the communication network 105. The storage 122 is a storage unit configured to store large-sized data in a short or long term. The sheet discharge apparatus connection port 123 is a connection unit configured to connect the sheet discharge apparatus. The image forming portion 124 is an image forming unit configured to form an image onto a sheet for each input image forming job. The controller 121 is a computer including a CPU, a ROM, and a RAM, or may be an embedded computer. The CPU executes a computer program for image formation control to form various functions for the image forming apparatus 101 and operate as a controller configured to control an operation of each of the functions. This operation is described later. The ROM stores the above-mentioned computer program for the image forming apparatus 101 and the like. The RAM is a work memory for the CPU.

The storage 122 of the image forming apparatus 101 stores job data 130, a processed-job list 131, apparatus display information 132, and stacking state information 133. Examples of the job data 130 include image data and instruction data representing the details of the input image forming job, data obtained after execution of the image forming job, and data obtained during the process of execution of the image forming job. The processed-job list 131 is a list storing the image forming jobs executed by the image forming apparatus 101 as the processed jobs. The processed-job list 131 stores job attributes such as a job ID, a job name, the number of pages, the number of bundles, and a sheet in association with one another.

The apparatus display information 132 is one type of first information representing the entire configuration of the image forming unit and a plurality of sheet stacking units, and is referred to when a configuration image to be described later is generated. In the first embodiment, the image forming unit corresponds to the image forming apparatus 101, and the sheet stacking unit corresponds to a sheet discharge apparatus to be described later. Therefore, information representing the outer appearance, structure, and size of each of the image forming apparatus 101 and the sheet discharge apparatus, and the outer appearance, structure, and size as a whole during connection is referred to as the apparatus display information 132. For example, the apparatus display information 132 represents a mode in which, when three sheet discharge apparatus are connected to the image forming apparatus 101 in a daisy-chain configuration, the sheet discharge apparatus adjacent to the image forming apparatus 101 is arranged as the first sheet discharge apparatus, and then the second sheet discharge apparatus and the third sheet discharge apparatus are sequentially arranged. The apparatus display information 132 is determined based on the combination of the connected sheet discharge apparatus. The sheet discharge apparatus is arranged to be replaceable with other sheet discharge apparatus. Therefore, the apparatus display information 132 is updated to the latest information as appropriate.

The stacking state information 133 is one type of second information representing a sheet discharge state of sheets having images formed thereon in each sheet stacking unit, and is referred to when a sheet image to be described later is generated. The sheet having an image formed thereon is hereinafter referred to as "sheet". Further, a bundle of a plurality of sheets may be hereinafter referred to as "sheet bundle". The stacking state information 133 includes information representing the shape and the size of the sheet or the sheet bundle, which is required for generating a sheet image to be described later, and information representing a correspondence between the sheet and the image forming job executed for the image formation on the sheet. The information is updated in real time every time a detection result of a stacking state detected by a detector to be described later is received. The "stacking state" herein refers to presence or absence of a sheet at a sheet stacking portion (including the change in a portion at which the sheets are stacked), and the outer shape and the size of the sheet. The "stacking state" further includes the transition of the sheet stacking height and the correspondence between the sheet and the image forming job. As described above, the "stacking state" refers to all the changes in sheet state until the sheets are collected by an ejecting operation to be described later.

Next, the sheet discharge apparatus to be connected to the sheet discharge apparatus connection port 123 of the image forming apparatus 101 are described. The sheet discharge apparatus refers to a large-capacity stacker and a finisher, and are apparatus capable of being combined or replaced afterwards. Those sheet discharge apparatus operate as sheet stacking units capable of stacking and collecting the sheets for each image forming job. That is, each sheet discharge apparatus stacks sheets corresponding to a processed job onto the sheet stacking portion to achieve a sheet bundle of each image forming job.

Figure 2:
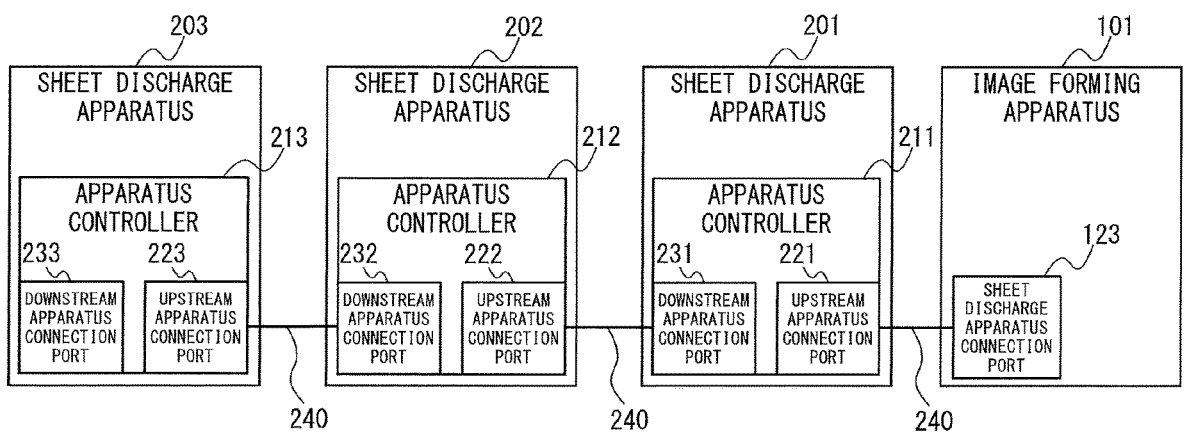
FIG. 2 is a schematic diagram for illustrating a state in which sheet discharge apparatus are connected to an image forming apparatus.

FIG. 2 is a schematic diagram for illustrating a connection example in a case in which three sheet discharge apparatus 201 to 203 are connected to the sheet discharge apparatus connection port 123 in a daisy-chain configuration. The sheet discharge apparatus 201 to 203 include apparatus controllers 211, 212, and 213, respectively, for controlling the operation of each own apparatus. The apparatus controllers 211, 212, and 213 include upstream apparatus connection ports 221, 222, and 223 and downstream apparatus connection ports 231, 232, and 233, respectively. Each of the upstream apparatus connection ports 221, 222, and 223 is a port for connecting to an apparatus on the upstream of the own apparatus via a communication cable 240. Each of the downstream apparatus connection ports 231, 232, and 233 is a port for connecting to an apparatus on the downstream of the own apparatus via the communication cable 240. In this manner, the image forming apparatus 101 and the three sheets discharge apparatus 201, 202, and 203 can communicate with each other. The third sheet discharge apparatus 203 may be omitted, or another apparatus that can communicate with the image forming apparatus 101 may be connected on the downstream of the third sheet discharge apparatus 203.

Figure 3:
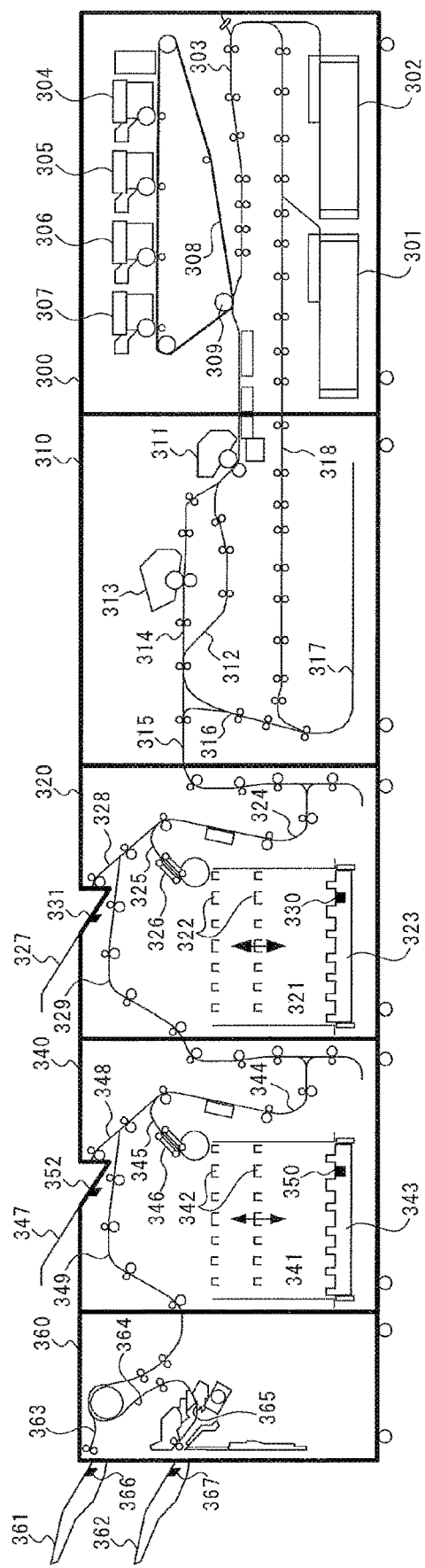
FIG. 3 is a sectional view for illustrating conveyance mechanisms of the image forming system.

Each of the image forming apparatus 101 and the sheet discharge apparatus 201, 202, and 203 includes a sheet conveyance mechanism as a mechanical element. FIG. 3 is an explanatory view for illustrating those conveyance mechanisms. In FIG. 3, an image forming unit 300 is a unit configured to form an image to be transferred onto a sheet, and corresponds to the image forming portion 124 in FIG. 1. An image fixing unit 310 is a unit configured to fix the transferred image. Two large-capacity stackers 320 and 340 and one finisher 360 are connected to the image fixing unit 310 in a daisy-chain configuration.

In the image forming unit 300, each of sheet feeding decks 301 and 302 separates one uppermost sheet among the received sheets to convey the sheet to a sheet conveyance path 303. Development stations 304 to 307 use toner having colors of yellow (Y), magenta (M), cyan (C), and black (K) to cause adhesion of toner images. The adhering toner images are primarily transferred onto an intermediate transfer belt 308. The intermediate transfer belt 308 rotates, for example, clockwise to convey the sheet to a secondary transfer position 309. At this time, the toner images are transferred onto the sheet conveyed through the sheet conveyance path 303. The sheet having the toner images transferred thereon is conveyed to the image fixing unit 310. In the image fixing unit 310, a fixing unit 311 melts and pressurizes the toner images to fix the toner images onto the sheet. The sheet that has passed through the fixing unit 311 is conveyed from a sheet conveyance path 312 to a sheet conveyance path 315. Additional heating and pressurization may be required depending on the sheet type. In this case, after the sheet passes through the fixing unit 311, the sheet is conveyed to a second fixing unit 313 using a sheet conveyance path in the stage subsequent to the fixing unit 311. The sheet subjected to additional heating and pressurization is conveyed to a sheet conveyance path 314.

A reversing portion 316 reverses the conveyed sheet by a switch-back method. When an image is formed on one side of the sheet, the reversed sheet, that is, the sheet having an image formed thereon, is conveyed to the sheet conveyance path 315. When images are formed on both sides of the sheet, the sheet is conveyed to a duplex reverse path 317, and is reversed to be conveyed to a duplex conveyance path 318. In this manner, an image is formed on the second side at the secondary transfer position 309, and the sheet is conveyed to the sheet conveyance path 315. The sheet that has passed through the sheet conveyance path 315 passes through a sheet conveyance path 324 to be input to the large-capacity stacker 320.

The large-capacity stacker 320 includes a stacking portion 321 including a lift tray 322 and an ejection tray 323, which are each configured to stack sheets. Those trays are controlled by the apparatus controller 211 illustrated in FIG. 2.

The lift tray 322 is positioned at a sheet stacking portion having a predetermined height under a state in which no sheets are stacked, and is lowered when the stacking proceeds. The ejection tray 323 is a tray for re-stacking the sheets at a time point at which the lift tray 322 is lowered to a re-stacking position, to thereby eject the sheets to the outside of the apparatus. The lift tray 322 and the ejection tray 323 are formed so that their bars for supporting the sheets are present at alternate positions. Therefore, the sheets on the lift tray 322 can be re-stacked onto the ejection tray 323 without issue.

The sheet passes through the sheet conveyance path 324 and a sheet conveyance path 325 to be conveyed to a sheet discharge unit 326. The sheet discharge unit 326 includes a lower rotary member and an upper rotary member that are configured to nip the sheet, and to discharge the sheet in a flipped manner to the lift tray 322. The action of "discharging the sheet in a flipped manner" refers to an action of discharging the sheet with the front and back sides being reversed so that one of both surfaces of the sheet on a side in contact with the lower rotary member of the sheet discharge unit 326 is turned to become an upper surface on the lift tray 322.

The lift tray 322 is controlled to be lowered by an amount of a height of the stacked sheets as the stacking of the sheets proceeds so that an upper end of the stacked sheets is at a predetermined height. When the lift tray 322 is in a fully-stacked state, the lift tray 322 is lowered to the position of the ejection tray 323. The "fully-stacked state" refers to a state in which the sheets reach a maximum stackable amount of the lift tray 322 and no more sheets can be stacked on the lift tray 322. Then, at a time point at which the lift tray 322 reaches the re-stacking position that is lower than the ejection tray 323, the sheets are re-stacked onto the ejection tray 323. After that, the ejection tray 323 is carried to the outside of the apparatus. In this manner, the sheets are removable. This operation is called "ejecting operation".

The large-capacity stacker 320 further includes a top tray 327. The top tray 327 is one sheet stacking portion mainly used for outputting a sample of the sheets to be stacked on the stacking portion 321. During discharge of the sheets to the stacking portion 321, one sheet (or one bundle) is output to the top tray 327 as a sample. In this manner, the quality of the image formation can be checked without taking out the sheets stacked in the stacking portion 321. When a sheet is output to the top tray 327, the sheet passes through the sheet conveyance path 324 and a sheet conveyance path 328 to be conveyed to the top tray 327. When a sheet is conveyed to an apparatus on the downstream of the large-capacity stacker 320, the sheet is conveyed through a sheet conveyance path 329.

The ejection tray 323 and the top tray 327 include sheet presence/absence detection sensors 330 and 331, respectively. The sheet presence/absence detection sensors 330 and 331 operate as one type of detection unit configured to detect the change in stacking state of the sheets on the tray at every predetermined timing. The controller 121 receives the detection results of the sheet presence/absence detection sensors 330 and 331 in time series, and updates the stacking state information 133 in the storage 122 based on the received detection results. In the first embodiment, description is given of an example in which the sheet presence/absence detection sensor detects the change in sheet stacking state, but the present disclosure is not limited thereto. For example, another sensor configured to detect the sheet stacking height may be provided, and the sensor may detect the change in sheet stacking state. Further, the CPU of the controller 121 may detect the change in sheet stacking state.

The large-capacity stacker 340 has the same configuration as that of the large-capacity stacker 320. That is, the stacking portion 321 (lift tray 322 and ejection tray 323) of the large-capacity stacker 320 corresponds to a stacking portion 341 (lift tray 342 and ejection tray 343) of the large-capacity stacker 340. Similarly, the sheet conveyance paths 324, 325, 328, and 329 and the sheet discharge unit 326 of the large-capacity stacker 320 correspond to sheet conveyance paths 344, 345, 348, and 349 and a sheet discharge unit 346 of the large-capacity stacker 340, respectively. Further, the top tray 327 and the sheet presence/absence detection sensors 330 and 331 of the large-capacity stacker 320 correspond to a top tray 347 and sheet presence/absence detection sensors 350 and 352 of the large-capacity stacker 340, respectively. Those components are controlled by the apparatus controller 212.

The finisher 360 subjects the conveyed sheet to predetermined post-processing under the control of the apparatus controller 213 illustrated in FIG. 2 based on the function designated by the operator. As an example of the post-processing, in the first embodiment, the sheet is subjected to stapling (one-portion or two-portion binding) and punching (two or three holes). The finisher 360 includes two sheet discharge trays 361 and 362 each serving as a sheet stacking portion. To the sheet discharge tray 361, a sheet not to be subjected to post-processing, for example, stapling, is discharged through a sheet conveyance path 363. To the sheet discharge tray 362, a sheet subjected to a finishing function designated by the operator is discharged through sheet conveyance paths 364 and 365.

Each of the sheet discharge trays 361 and 362 is configured to be freely raised or lowered. It is also possible to perform such an operation that the sheet discharge tray 361 is lowered so that a plurality of sheets subjected to post-processing are stacked onto the sheet discharge tray 361. The sheet discharge trays 361 and 362 include sheet presence/absence detection sensors 366 and 367, respectively, which are each configured to detect the stacking state of the sheets on the tray. The sheet presence/absence detection sensors 366 and 367 also operate as one type of detection unit configured to detect the change in stacking state of sheets on the tray at every predetermined timing. The detection results are transmitted to the image forming apparatus 101 in time series by the apparatus controllers (see FIG. 2) included in the large-capacity stackers 320 and 340.

Next, description is given of the sheet stacking state in the large-capacity stacker 320 with reference to FIG. 4A to FIG. 4G. In each drawing, a right side as viewed from an observer corresponds to a sectional view in which the mechanical elements of the large-capacity stacker 320 are viewed from the front side, and a left side as viewed from the observer corresponds to a sectional view in which the mechanical elements of the large-capacity stacker 320 are viewed from the left lateral side. The large-capacity stacker 340 has a similar configuration, and hence the large-capacity stacker 320 is described as a representative stacker.

Figure 4A:
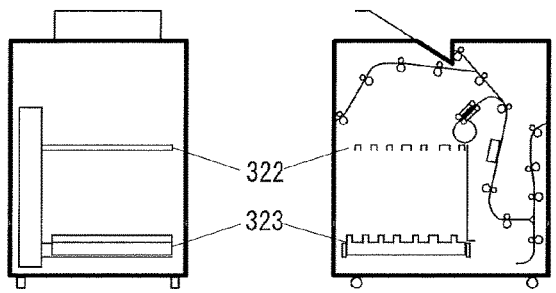
FIG. 4A, FIG. 4B, FIG. 4C, FIG. 4D, FIG. 4E, FIG. 4F, and FIG. 4G are schematic views for illustrating a process of an ejecting operation.

FIG. 4A is an illustration of a state in which no sheets are stacked on the large-capacity stacker 320. The lift tray 322 is raised and stopped at a predetermined height, that is, at a position of a sheet discharge port for discharging the sheets to the stacking portion 321. The ejection tray 323 is accommodated in the apparatus. FIG. 4B is an illustration of a state during an image forming operation. As the stacking of the sheet proceeds, the apparatus controller gradually lowers the lift tray 322 so that the height of the uppermost surface of the stacked sheets matches the position of the sheet discharge port of the stacking portion 321. FIG. 4C is an illustration of a state in which a fully-stacked state of the lift tray 322 is detected. When the lift tray 322 is in the fully-stacked state, stacking onto the lift tray 322 cannot be continued any more. Therefore, the apparatus controller starts control of re-stacking the stacked sheets onto the ejection tray 323.

Figure 4E:
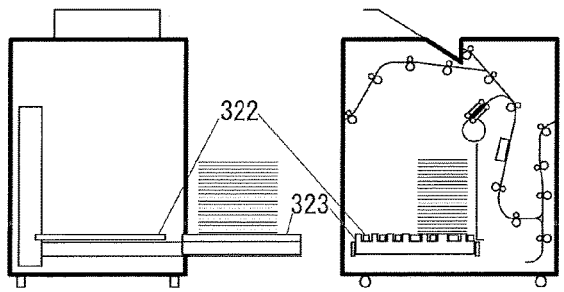
Figure 4B:
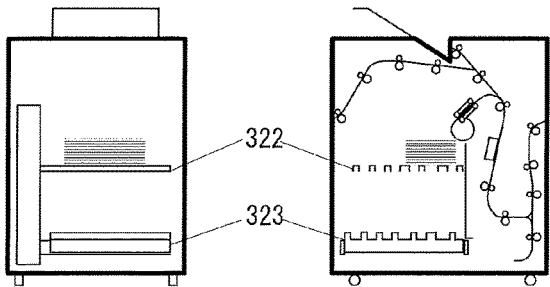
Figure 4F:
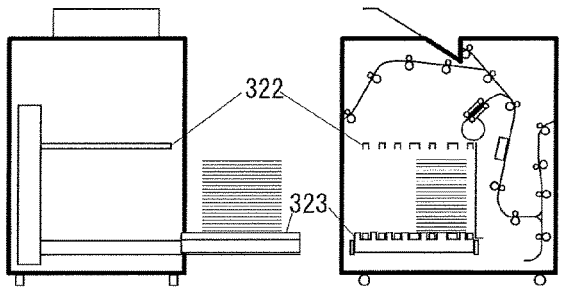
Figure 4C:
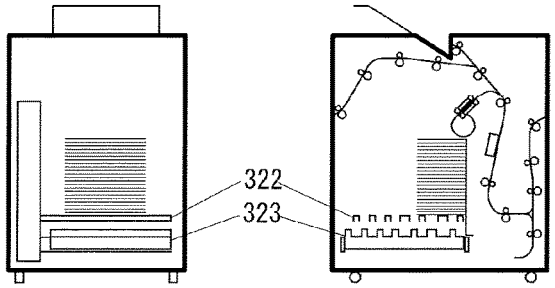
Figure 4G:
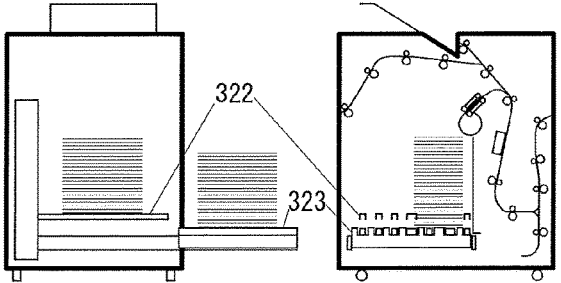
Figure 4D:
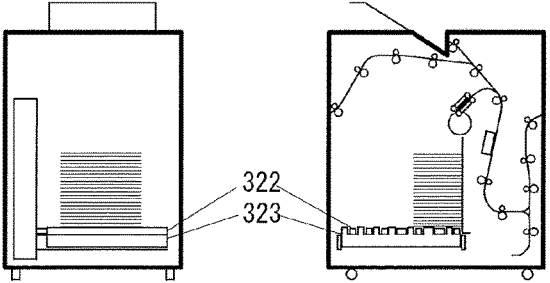

FIG. 4D is an illustration of a state in which the lift tray 322 is lowered to the re-stacking position of the ejection tray 323 and the sheets are re-stacked onto the ejection tray 323. Even when the lift tray 322 is lowered to the same height as that of the ejection tray 323, the bars for supporting the sheets are located at alternate positions, and hence the bars do not interfere with each other. At a time point at which the lift tray 322 reaches the re-stacking position that is lower than the ejection tray 323, there is obtained a state in which the sheets stacked on the lift tray 322 are re-stacked onto the ejection tray 323.

FIG. 4E is an illustration of a state in which the ejection tray 323 having the sheets stacked thereon is ejected to the outside of the apparatus. When the ejection tray 323 is ejected as described above, the stacked sheets become collectable. FIG. 4F is an illustration of a state in which, under a state in which the ejection tray 323 is ejected, the lift tray 322 is raised again to the position at which the subsequent sheets are stacked thereon. In this manner, sheets can be stacked on the lift tray 322. FIG. 4G is an illustration of a state in which, after the image formation is continued under a state in which the ejection tray 323 is ejected, the fully-stacked state of the lift tray 322 is detected. In this state, the ejection tray 323 is ejected, and hence the sheets stacked on the lift tray 322 cannot be re-stacked onto the ejection tray 323. The sheets stacked on the ejection tray 323 are required to be collected to continue the stacking in the large-capacity stacker 320.

Figure 5:
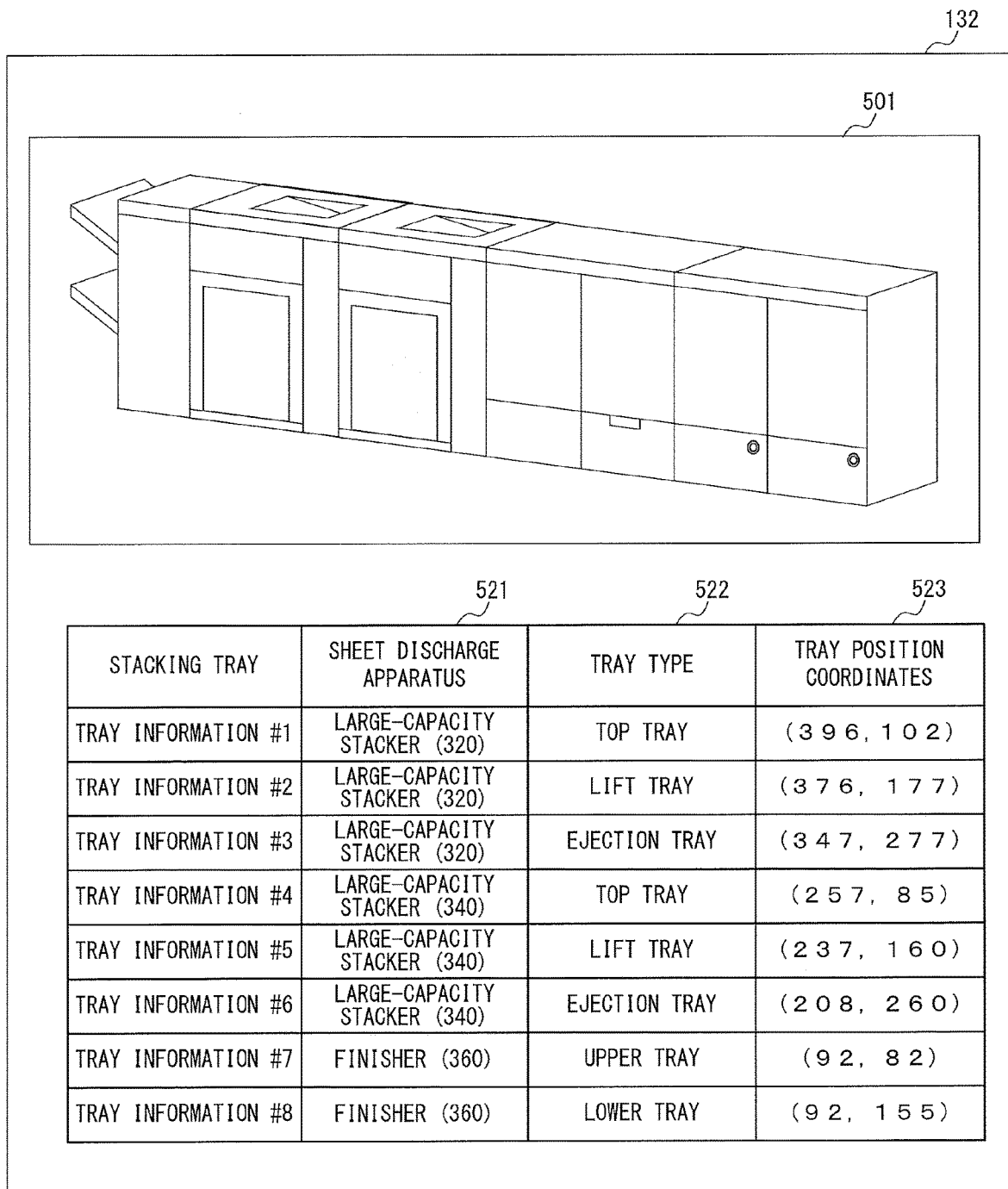
FIG. 5 is a diagram of apparatus display information.

FIG. 5 is a schematic diagram of the apparatus display information. Based on the apparatus display information 132 of FIG. 5 received from the image forming apparatus 101, display content to be described later is displayed on the display 113 of the information processing terminal 100. The display content of a screen to be displayed on the display 113 is generated by the controller 111. Alternatively, the controller 121 of the image forming apparatus 101 may generate the display content and the information processing terminal 100 may receive the display content.

The content of the apparatus display information 132 differs depending on the combination of the sheet discharge apparatus. In the first embodiment, for the sake of convenience of description, it is assumed that the apparatus display information 132 corresponding to all combinations of mountable sheet discharge apparatus is stored in advance. As an example, description is given of an example of the apparatus display information 132 corresponding to the configuration exemplified in FIG. 3. A schematic diagram is used in FIG. 5, but the actual apparatus display information 132 is stored in a form of an extensible markup language (XML) or comma-separated values (CSV), for example.

The upper stage of FIG. 5 represents a configuration image 501 that visualizes the entire configuration (configuration information representing configuration of image forming system) by expressing the entire configuration in, for example, a bitmap format, and the lower stage of FIG. 5 represents a table in which information on a position of the sheet discharge tray included in each sheet discharge apparatus is stored. The configuration image 501 can be displayed as a two-dimensional image or a three-dimensional image, but is displayed as a three-dimensional image in this case.

A sheet or a sheet bundle is not drawn in the configuration image 501 illustrated at the upper stage of FIG. 5, but when a sheet is conveyed, a structure image of the sheet discharge tray at the stacking portion for the sheet is also displayed. For example, there is displayed a configuration image including a structure image representing a lift tray and an ejection tray that are displaced in the above-mentioned large-capacity stackers 320 and 340. In the example illustrated in FIG. 3, each of the large-capacity stackers 320 and 340 includes three sheet discharge trays (top tray, lift tray, and ejection tray), and the finisher 360 includes two sheet discharge trays (upper tray and lower tray). Therefore, in such a configuration, a total of eight sheet discharge trays are usable. In the configuration image 501 at the upper stage of FIG. 5, an actual configuration and structure images of those sheet discharge apparatus and sheet discharge trays are displayed. Therefore, the operator can intuitively recognize which sheet discharge tray the sheets are stacked on.

In the table shown at the lower stage of FIG. 5, each of records of trays #1 to #8 corresponds to a sheet discharge apparatus 521 to which each tray is installed, a tray type 522, and tray position coordinates 523. That is, "tray #1" is the top tray of the large-capacity stacker 320, and is provided at tray position coordinates (396, 102) with reference to the configuration image 501. The tray position coordinates are offset values (pixel numbers) in a right direction and a lower direction with the upper left of the configuration image 501 serving as an origin. Other trays #2 to #8 have similar content.

Figure 6:
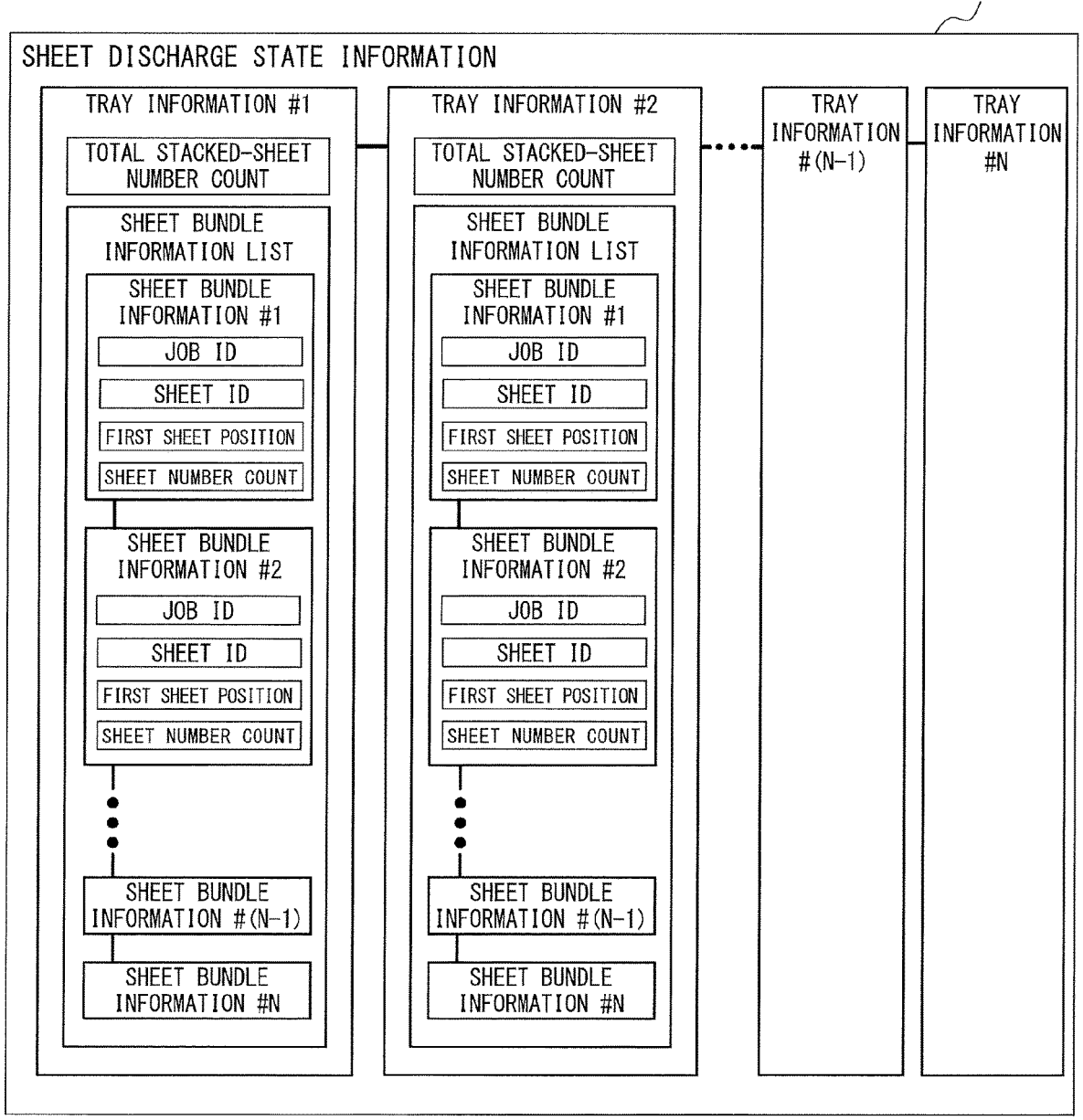
FIG. 6 is a diagram of stacking state information.

FIG. 6 is a diagram of the stacking state information 133. The stacking state information 133 is stored in the storage 122 by the controller 121, and is updated at a timing at which the detection result of the stacking state in each sheet discharge tray is received, for example. Further, the stacking state information 133 can be referred to by the controller 121 as appropriate. The stacking state information 133 has a list-type data structure. That is, tray information representing the stacking state of the usable sheet discharge tray for each tray is represented as tray information #1 to tray information #N. In the relationship with the table shown at the lower stage of FIG. 5, the detection result of the stacking state in the tray #1 corresponds to the tray information #1. The same applies to the tray information #2, the tray information #(N−1), and the tray information #N. N is a natural number, and N is 8 in the case of the configuration illustrated in FIG. 3.

In FIG. 6, the tray information #1 to the tray information #8 are in a data format having a total stacked-sheet number count and a sheet bundle information list as member variables. The total stacked-sheet number count is a variable for counting a total number of sheets stacked on the sheet discharge tray. In the sheet bundle information list, pieces of sheet bundle information for managing the information on each sheet bundle are arranged in a list in the stacking order of the sheets. When no sheets are stacked on any sheet discharge tray, the sheet bundle information list is an empty list. Each piece of sheet bundle information has, as member variables, a job ID, a sheet ID, a first sheet position, and a sheet number count.

The job ID is a variable representing an ID of an image forming job corresponding to the sheet bundle. Each image forming job is allocated with a unique ID by the image forming apparatus 101, and the ID is stored in the member variable. The sheet ID is a variable representing an ID of the sheet corresponding to the sheet bundle. The sheet is defined based on characteristics such as a size, a basis weight, and states of the front and back surfaces, and a sheet ID allocated for identifying the sheet is recorded in the member variable. The first sheet position is a variable representing what number the first sheet of the sheet bundle corresponds to when counted from the first sheet stacked on the sheet discharge tray. The sheet number count is a variable for counting the total number of sheets of the sheet bundle.

Figure 7:
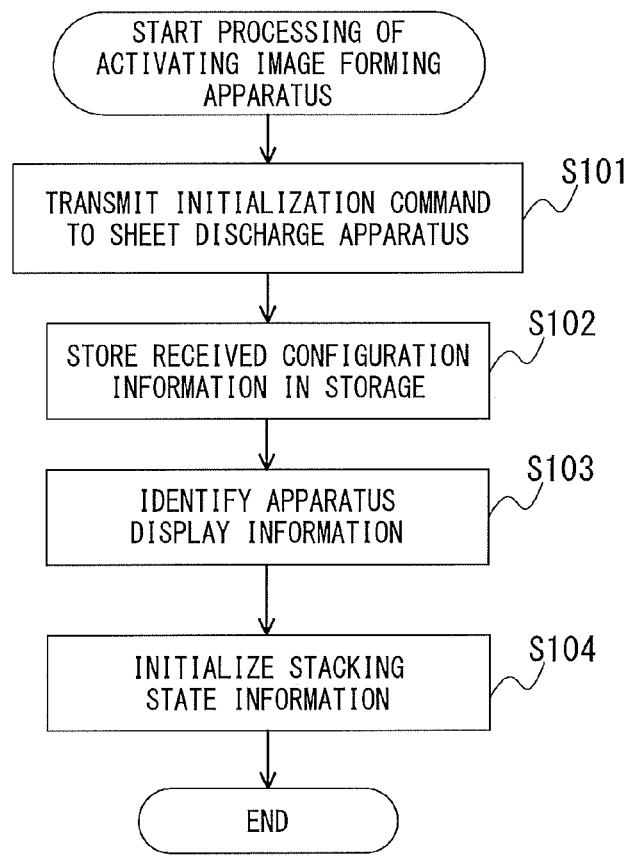
FIG. 7 is a control flow for illustrating an operation procedure at the time when the image forming apparatus is activated.

Next, an operation of the image forming system 1 in the first embodiment is described. First, the operation of the image forming apparatus 101 at the time of activation thereof is described with reference to FIG. 7. FIG. 7 is a control flow of the operation to be executed when the image forming apparatus 101 is activated. This control flow is executed by the controller 121 controlling each portion in the image forming apparatus 101. When the image forming apparatus 101 is activated, the controller 121 transmits an initialization command to all of the connected sheet discharge apparatus (Step S101). The initialization command is transmitted to each sheet discharge apparatus via the communication cable. When each sheet discharge apparatus receives the initialization command, each sheet discharge apparatus transmits back to the image forming apparatus 101 the sheet discharge apparatus ID, which is an example of the configuration information for identifying the type of the own apparatus.

The controller 121 stores the received sheet discharge apparatus ID in the storage 122 (Step S102). With the sheet discharge apparatus ID, it can be recognized how the sheet discharge apparatus connected to the image forming apparatus 101 are currently arranged (order of the sheet discharge apparatus and the like), and as a result, where the sheet stacking portion is positioned. The controller 121 identifies the apparatus display information 132 corresponding to the configuration of the currently-connected sheet discharge apparatus based on the stored sheet discharge apparatus ID from the apparatus display information 132 stored in advance in accordance with the combination of the sheet discharge apparatus (Step S103). For example, in the configuration illustrated in FIG. 3, the apparatus display information 132 corresponding to the configuration in which two large-capacity stackers and one finisher are connected is identified.

After the apparatus display information 132 is identified, the controller 121 initializes the stacking state information 133 (Step S104). That is, the stacking state information 133 is newly generated based on the sheet discharge apparatus ID stored in Step S102. Sheets are not stacked yet on any sheet discharge tray immediately after the image forming apparatus 101 is activated. Therefore, in each piece of tray information of the stacking state information 133, the total stacked-sheet number count is 0, and the sheet bundle information list is an empty list.

Figure 8:
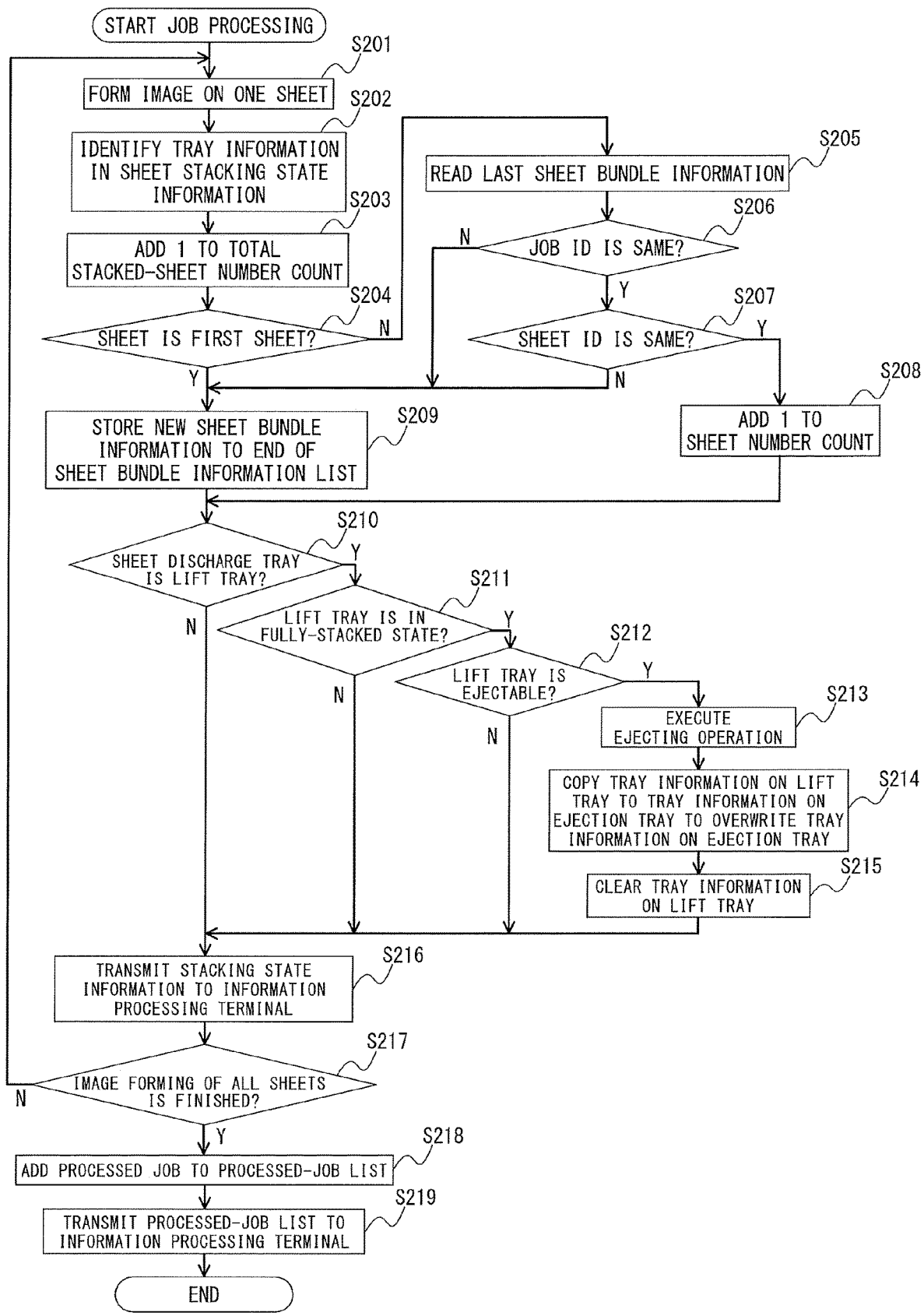
FIG. 8 is a control flow for illustrating an operation procedure at the time when an image forming job is processed.

Next, with reference to FIG. 8, description is given of an operation example at the time when the image forming job is executed in the image forming apparatus 101. It is assumed that the image forming job is received from, for example, the information processing terminal 100. The image forming job includes information on the sheet stacking portion, that is, designation of tray information on the sheet discharge apparatus to be used. In the following description, for the sake of convenience, it is assumed that the tray information on the large-capacity stacker 320 is designated. FIG. 8 is a control flow of the image forming apparatus 101 at this time. This control flow is also executed by the controller 121 integrally controlling the respective portions of the apparatus.

In the image forming apparatus 101, image formation of one sheet is performed in the order of pages in accordance with the image forming job. After the image formation, the conveyance of the sheet toward the large-capacity stacker 320 designated by the image forming job is started (Step S201). At this time, the controller 121 identifies the tray information on the designated large-capacity stacker 320 (Step S202). The tray information can be identified by referring to the apparatus display information 132 determined based on the configuration of the sheet discharge apparatus. For example, tray #1 of the tray information of the table at the lower stage of FIG. 5 is referred to. Tray #1 corresponds to the top tray of the large-capacity stacker 320. Similarly, tray #2 corresponds to the lift tray of the large-capacity stacker 320. When tray #2 is identified here, the controller 121 refers to the record of tray #2 as the tray information.

The controller 121 adds 1 to the total stacked-sheet number count of the identified tray information (Step S203). The controller 121 further determines whether or not the discharged sheet is the first sheet in the sheet discharge tray based on the value of the total stacked-sheet number count (Step S204). When the sheet is not the first sheet (Step S204: N), the controller 121 refers to the tray information to read last sheet bundle information in the sheet bundle information list (Step S205). Then, the controller 121 determines whether or not the job ID of the job for which the image formation is performed is the same as the job ID in the sheet bundle information read in Step S205 (Step S206). When the job ID is the same (Step S206: Y), the controller 121 determines whether or not the sheet ID of the sheet subjected to image formation in Step S201 is the same as the sheet ID in the sheet bundle information read in Step S205 (Step S207). When the sheet ID is the same (Step S207: Y), the controller 121 adds 1 to the sheet number count of the last sheet bundle information in the tray information (Step S208), and the processing proceeds to Step S210.

When the sheet is the first sheet in Step S204 (Step S204: Y), when the job ID differs in Step S206 (Step S206: N), or when the sheet ID differs in Step S207 (Step S207: N), the controller 121 executes the processing of Step S209. In Step S209, new sheet bundle information is generated at the end of the sheet bundle information list in the tray information. The member variables of the generated new sheet bundle information are as follows. First, the job ID is the job ID of the job for which the image formation is performed. The sheet ID is a sheet ID corresponding to the sheet subjected to image formation in Step S201. The total stacked-sheet number count is input as the first sheet position. Finally, the sheet number count becomes 1.

Next, the controller 121 determines whether or not the sheet discharge tray designated in Step S201 is the lift tray of the large-capacity stacker (Step S210). When the sheet discharge tray is the lift tray (Step S210: Y), the controller 121 determines whether or not the lift tray is in the fully-stacked state after sheets are discharged in Step S201 (Step S211). When the lift tray is in the fully-stacked state (Step S211: Y), the controller 121 determines whether or not the lift tray in the fully-stacked state in Step S211 is ejectable (Step S212). Whether the lift tray is ejectable is determined based on whether or not the sheet bundles are stacked on the ejection tray of the same large-capacity stacker.

When the sheet bundles are stacked on the ejection tray, that is, when the sheet presence/absence detection sensor 330 or the like detects that the sheet bundles are stacked, the controller 121 determines that the lift tray is not ejectable. Otherwise, the controller 121 determines that the lift tray is ejectable. When the lift tray is ejectable (Step S212: Y), the controller 121 re-stacks the sheet bundles stacked on the lift tray detected to be in the fully-stacked state in Step S211 onto the ejection tray, and executes the ejecting operation (Step S213). After that, the controller 121 copies, in the stacking state information 133, the tray information on the lift tray for which the ejecting operation of the large-capacity stacker 320 is executed in Step S213, to the tray information on the same large-capacity stacker to overwrite the tray information on the same large-capacity stacker (Step S214). Further, the controller 121 clears, in the stacking state information 133, the tray information on the lift tray for which the ejecting operation is executed in Step S213 (Step S215). In this case, clearing the tray information refers to obtaining an empty sheet bundle information list by setting the total stacked-sheet number count in the tray information to 0.

When the sheet discharge tray is not the lift tray (Step S210: N), or when the lift tray is not in the fully-stacked state (Step S211: N), the controller 121 transmits the stacking state information 133 to the information processing terminal 100 (Step S216). Further, also when the lift tray is not ejectable (Step S212: N), or after the tray information on the lift tray is cleared (Step S215), the controller 121 transmits the stacking state information 133 to the information processing terminal 100 (Step S216).

After that, the controller 121 determines whether or not the image formation of all of the sheets by the image forming job is finished (Step S217). When the image formation is not finished yet (Step S217: N), the processing returns to Step S201. When image formation of all of the sheets is finished (Step S217: Y), the controller 121 adds the processed job to the processed-job list 131 (Step S218). Then, the controller 121 transmits the processed-job list 131 that has been updated based on the addition to the information processing terminal 100 (Step S219), and the series of processing is ended.

Figure 9:
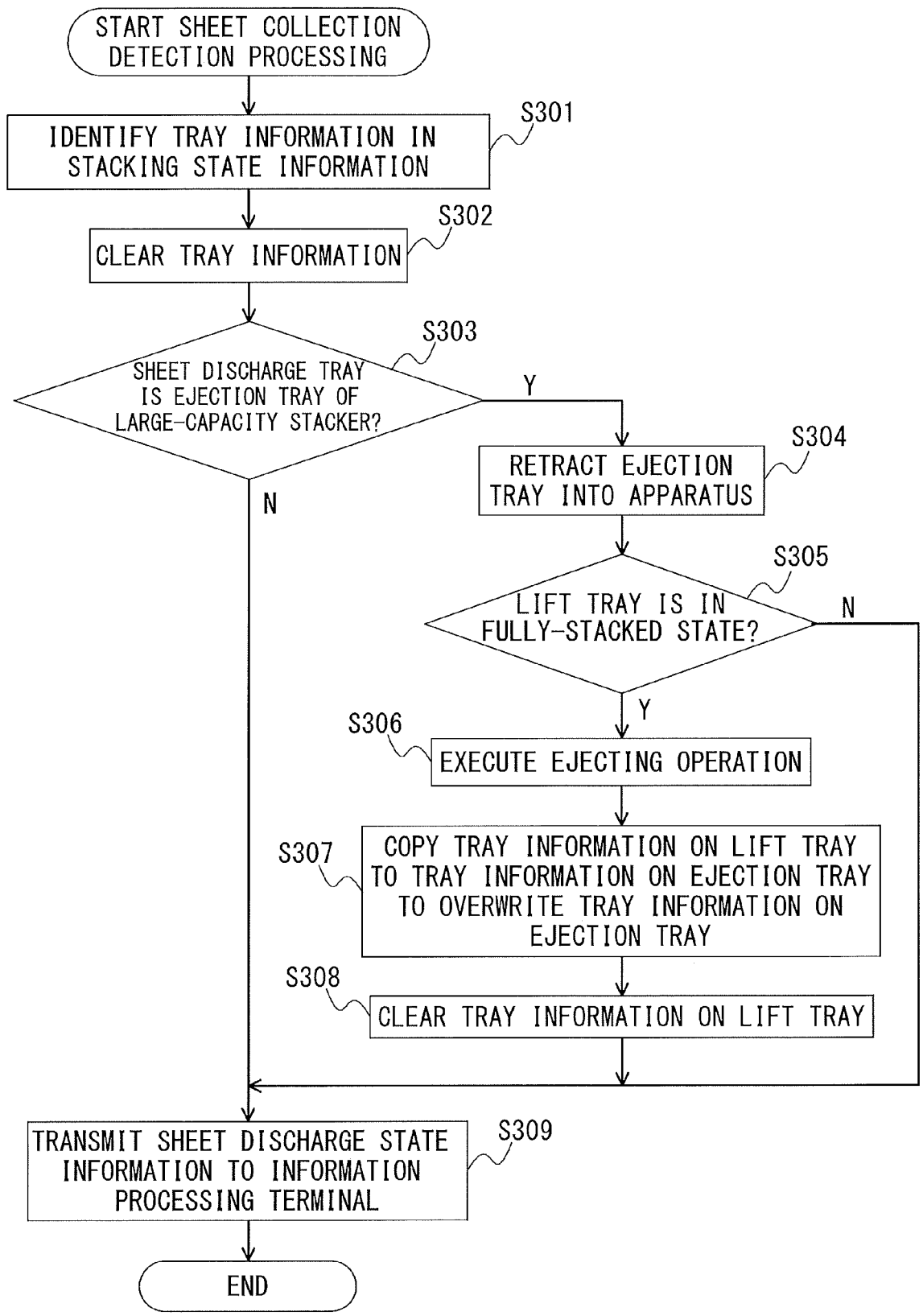
FIG. 9 is a control flow of removing sheets from a sheet discharge tray.

Next, with reference to FIG. 9, description is given of an operation at the time when the collection of sheets from the sheet discharge tray is detected in the image forming apparatus 101. FIG. 9 is a control flow of sheet collection detection processing. This control flow is also executed by the controller 121 integrally controlling the respective portions of the apparatus. The sheet collection is detected when a state in which the sheet presence/absence detection sensors (in the configuration illustrated in FIG. 3, denoted by 330, 331, 350, 352, 366, and 367) detect the stacking state of the sheet bundles is changed to a state in which the stacking state is not detected any more.

The controller 121 refers to the stacking state information 133 to identify the tray information corresponding to the sheet discharge tray at which the sheet collection is detected (Step S301). Then, the controller 121 clears the tray information (Step S302). The controller 121 further determines whether or not the sheet discharge tray is the ejection tray of the large-capacity stacker (Step S303). When the sheet discharge tray is the ejection tray (Step S303: Y), the controller 121 retracts the ejection tray into the apparatus (large-capacity stacker) (Step S304). Further, the controller 121 determines whether or not the lift tray of the large-capacity stacker at which the sheet collection is detected is in the fully-stacked state (Step S305). When the lift tray is in the fully-stacked state (Step S305: Y), the controller 121 re-stacks the sheets stacked on the lift tray in the fully-stacked state onto the ejection tray to execute the ejecting operation (Step S306). Then, the controller 121 copies, in the stacking state information 133, the tray information on the lift tray for which the ejecting operation is executed, to the tray information on the ejection tray of the large-capacity stacker to overwrite the tray information on the ejection tray (Step S307). After that, the controller 121 clears, in the stacking state information 133, the tray information on the lift tray for which the ejecting operation is executed (Step S308).

When the sheet discharge tray corresponding to the empty tray information is not the ejection tray (Step S303: N), the controller 121 transmits the stacking state information 133 to the information processing terminal 100 (Step S309), and ends the series of processing. The same processing is performed when the lift tray is not in the fully-stacked state (Step S305: N) and after the tray information on the lift tray is cleared in Step S308.

Figure 10:
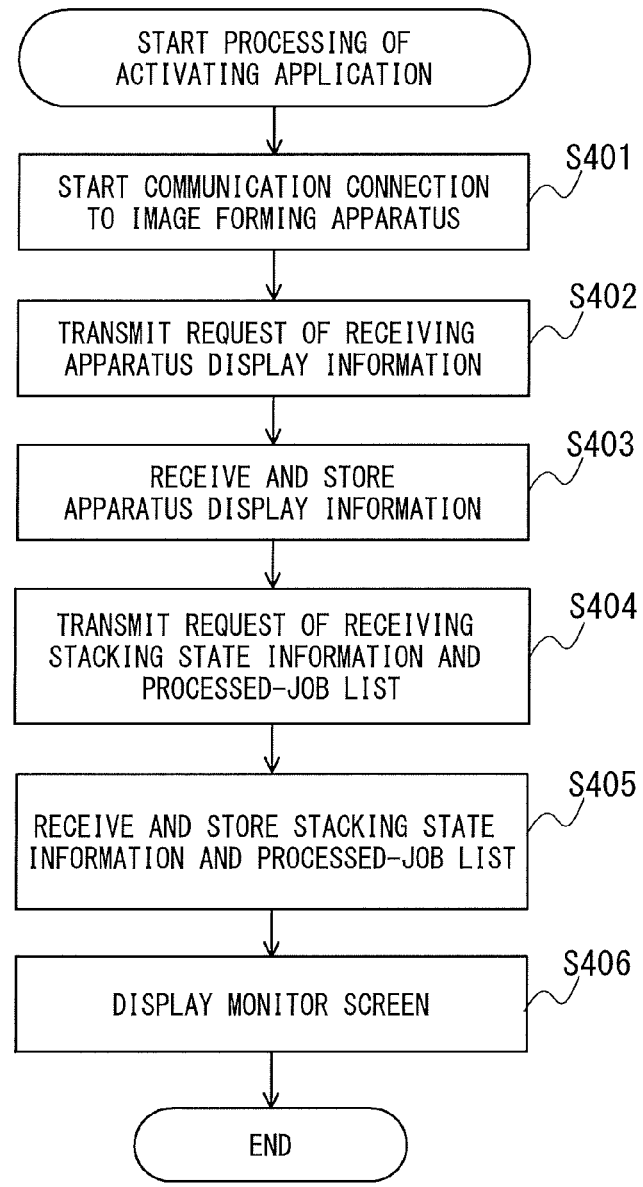
FIG. 10 is a control flow at the time when an application is activated in an information processing terminal.

The operator can recognize the stacking state of each sheet discharge apparatus connected to the image forming apparatus 101 as required via an application executed by the computer program for terminal control in the information processing terminal 100. The operation of the information processing terminal 100 at this time is described with reference to FIG. 10. FIG. 10 is a control flow at the time when the application is activated. This control flow is executed by the controller 111 integrally controlling the respective portions of the terminal.

When an application is activated in the information processing terminal 100, the controller 111 establishes communication with the image forming apparatus 101 (Step S401). Once the communication is established, the communication is maintained until the operator inputs a clear cancel instruction. When the communication is established, a request of receiving the apparatus display information 132 is transmitted to the image forming apparatus 101 (Step S402). When the image forming apparatus 101 receives this acquisition request, the image forming apparatus 101 transmits the apparatus display information 132 corresponding to the current apparatus configuration. When the apparatus display information 132 is updated while the communication is established, the image forming apparatus 101 transmits the updated apparatus display information 132 to the information processing terminal 100. When the information processing terminal 100 receives the updated apparatus display information 132 from the image forming apparatus 101, the information processing terminal 100 stores the apparatus display information 132 in the storage 112 (Step S403). For example, the information processing terminal 100 receives the apparatus display information 132 to sequentially store the apparatus display information 132 in the storage 112.

The controller 111 further transmits a request of receiving the sheet stacking information and the processed-job list to the image forming apparatus 101 (Step S404). When the image forming apparatus 101 (controller 121) receives this acquisition request, the image forming apparatus 101 (controller 121) transmits the stacking state information 133 and the processed-job list 131 that are currently stored to the information processing terminal 100. The controller 111 stores the stacking state information 133 and the processed-job list 131 received from the image forming apparatus 101 to the storage 112 (Step S405). For example, the controller 111 sequentially stores the received stacking state information 133 and processed-job list 131 in the storage 112. The controller 111 generates a monitor screen based on the stored apparatus display information 132, stacking state information 133, and processed-job list to display the monitor screen on the display 113 (Step S406).

An example of a monitor screen is illustrated in FIG. 11. In a monitor screen 1100 exemplified in FIG. 11, an image region 1101 and a list region 1110 are formed. The image region 1101 is a region for visually displaying the configuration image and the sheet stacking state of each image forming job, and has a two-display-layer structure. That is, the image region 1101 includes a first display layer for displaying the configuration image, and a second display layer for mapping a sheet image at the sheet stacking portion of the configuration image on the first display layer. In the first display layer, the configuration image (configuration image 501 illustrated in FIG. 5) generated based on the apparatus display information 132 stored in Step S403 is displayed. In the second display layer, based on the stacking state information 133 received by the information processing terminal 100, the sheet bundle image that visualizes the sheet or sheet-bundle stacking state in each sheet discharge tray is displayed. The display of the sheet image is updated in real time at a timing at which the change in sheet stacking state is detected. That is, the controller 111 is configured so that the mode of displaying the sheet image on the display 113 can be changed in real time for each image forming job.

In FIG. 11, there are illustrated sheet images 1121 to 1125 representing sheets stacked on the sheet discharge trays. That is, each of the sheet images 1121 to 1125 corresponding to the processed job is mapped to a position of the sheet discharge tray corresponding thereto.

In the processed-job list displayed in the list region 1110, a processed job identified by the operator is changed in display mode so that the identified processed job can be easily distinguished from other processed jobs. In the first embodiment, inversion display is performed as an example of changing the display mode. In the example illustrated in FIG. 11, a job displayed in an inverted manner is not illustrated. However, in the example of FIG. 18 to be referred to later, there is illustrated a state in which a processed job having a job ID of "00000003" (job name: image forming job #3) is identified as a processed job corresponding to a cursor position.

In the list region 1110, a processed-job list received by the information processing terminal 100 from the image forming apparatus 101 is displayed. In the processed-job list, job attributes (job ID, job name, number of pages, number of bundles, and used sheet) of each processed job are displayed. When the number of processed jobs listed in the processed-job list is larger than the number of jobs that can be displayed at one time in the list region 1110, a scroll bar 1111 is used. The operator can operate the scroll bar 1111 to display any processed job in the list region 1110. Further, on the monitor screen 1100, a cursor 1130, which can be operated with use of the input portion 114, is displayed. In this manner, the operator can designate any position of the monitor screen 1100.

Figure 12:
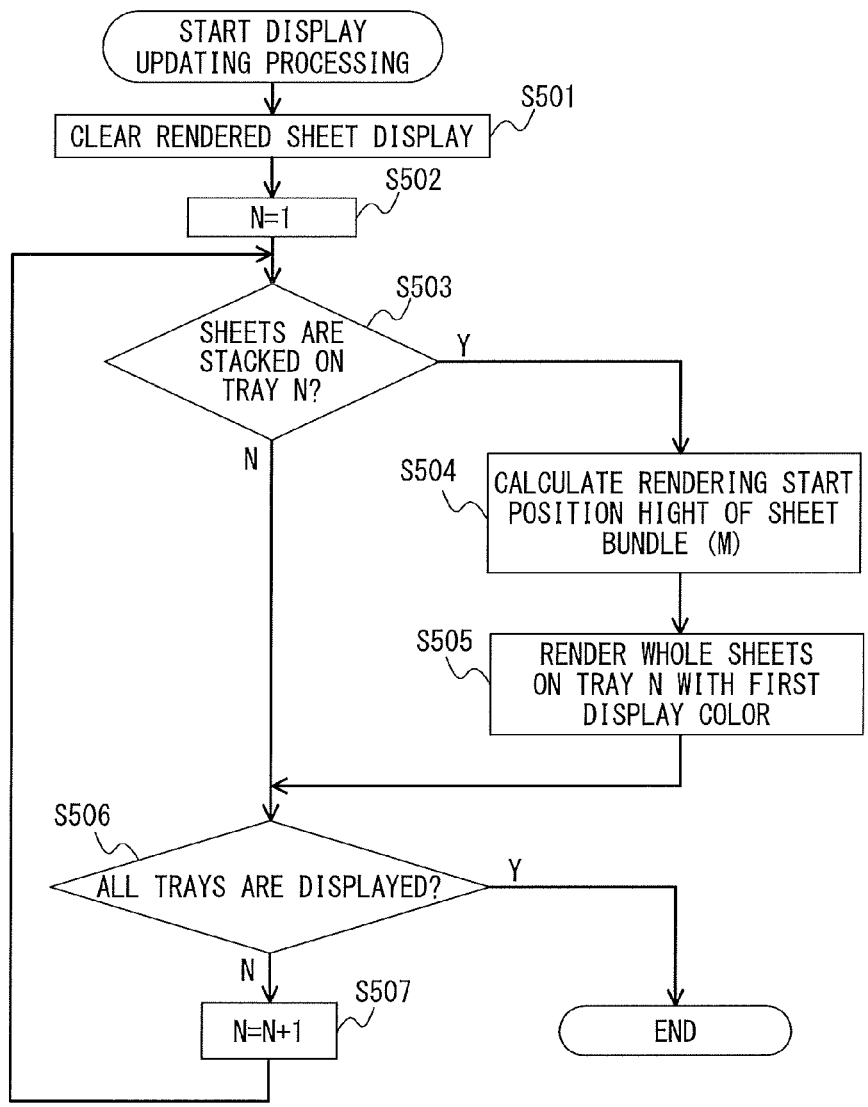
FIG. 12 is a control flow for illustrating an operation procedure of the information processing terminal.

FIG. 12 is a flow for illustrating an operation of the controller 111 at the time when the information processing terminal 100 receives sheet discharge state management information from the image forming apparatus 101. The controller 111 deletes the display of the sheet image displayed in the second display layer of the image region 1101 (Step S501). The controller 111 substitutes 1 for a variable N representing the stacking order of the sheet discharge tray (Step S502), and then determines whether or not the sheets are stacked on the tray N in the sheet discharge state information (Step S503). When the total stacked-sheet number count in the tray information N is 0, it is determined that no sheets are stacked. When no sheets are stacked (Step S503: N), the processing proceeds to Step S506. When the sheets are stacked (Step S503: Y), the controller 111 calculates a height (h1 in FIG. 13) of the sheet bundle stacked on the tray N (Step S504). In this case, when the entire sheet bundle stacked on the tray N is to be displayed, the pixel of the height of the sheet bundle is calculated. The height of the sheet bundle is calculated by multiplying the total stacked-sheet number count of the tray information N by a predetermined coefficient Q. The coefficient Q is a coefficient representing the pixel corresponding to the height of one sheet. When the height of the sheet bundle includes a decimal value as a result of calculation, the value is rounded up to an integer value. However, other appropriate processing can be performed such as rounding off the value to the closest whole number when the height of the sheet bundle includes a decimal value. The same applies to examples to be described later.

After the height of the sheet bundle is calculated, the controller 111 displays the sheet image representing the sheet bundle stacked on the tray N with a first display color (Step S505), and the processing proceeds to Step S506. A method of rendering the sheet image is described later. In Step S506, the controller 111 determines whether or not all pieces of tray information in the received stacking state information have been displayed. When all pieces of tray information have been displayed (Step S506: Y), a series of processing is ended. When the display of all pieces of tray information is not finished yet (Step S506: N), the controller 111 adds 1 to the variable N (Step S507), and the processing returns to Step S503.

Now, the method of rendering the sheet image to be displayed in Step S505 is described with reference to FIG. 13A to FIG. 13C. In this case, as an example, description is given of a method of rendering whole sheets on the ejection tray of the large-capacity stacker. A height (h1 of FIG. 13A) of a sheet image 1301 is the height of the whole sheets calculated in Step S504. The sheet image 1301 is rendered by seven points of a vertex A to a vertex G. In a list 1302 of FIG. 13B, which represents a method of calculating the coordinates of each vertex, the vertex A has tray position coordinates (coordinate values thereof are expressed as (x, y)) in the sheet discharge tray. The tray position coordinates of each sheet discharge tray are stored in the apparatus display information 132 stored in Step S403. The coordinate values of other vertices (B to G) are determined by adding or subtracting a predetermined offset value and the sheet height h1 to or from the coordinate values (x, y) of the vertex A.

The sheet image 1301 is rendered by a rendering command of, for example, scalable vector graphics (SVG). In FIG. 13C, there is shown an example of a rendering command 1303 of the sheet image 1301 at the time when the SVG is used. The shape of the sheet image 1301 differs depending on the shape of the corresponding sheet discharge tray, but the point that the shape is determined based on the tray position coordinates, the predetermined offset value, and the sheet height is the same.

When the sheet image is designated by the cursor 1130, the controller 111 identifies the image forming job corresponding to the cursor position, and allows the identified image forming job to be displayed so as to be distinguished from other image forming jobs in the processed-job list. At the same time, the controller 111 renders the sheet image corresponding to the cursor position with a second display color, which is different from the first display color, to thereby display the sheet image so as to be distinguished from other sheet images.

Figure 14:
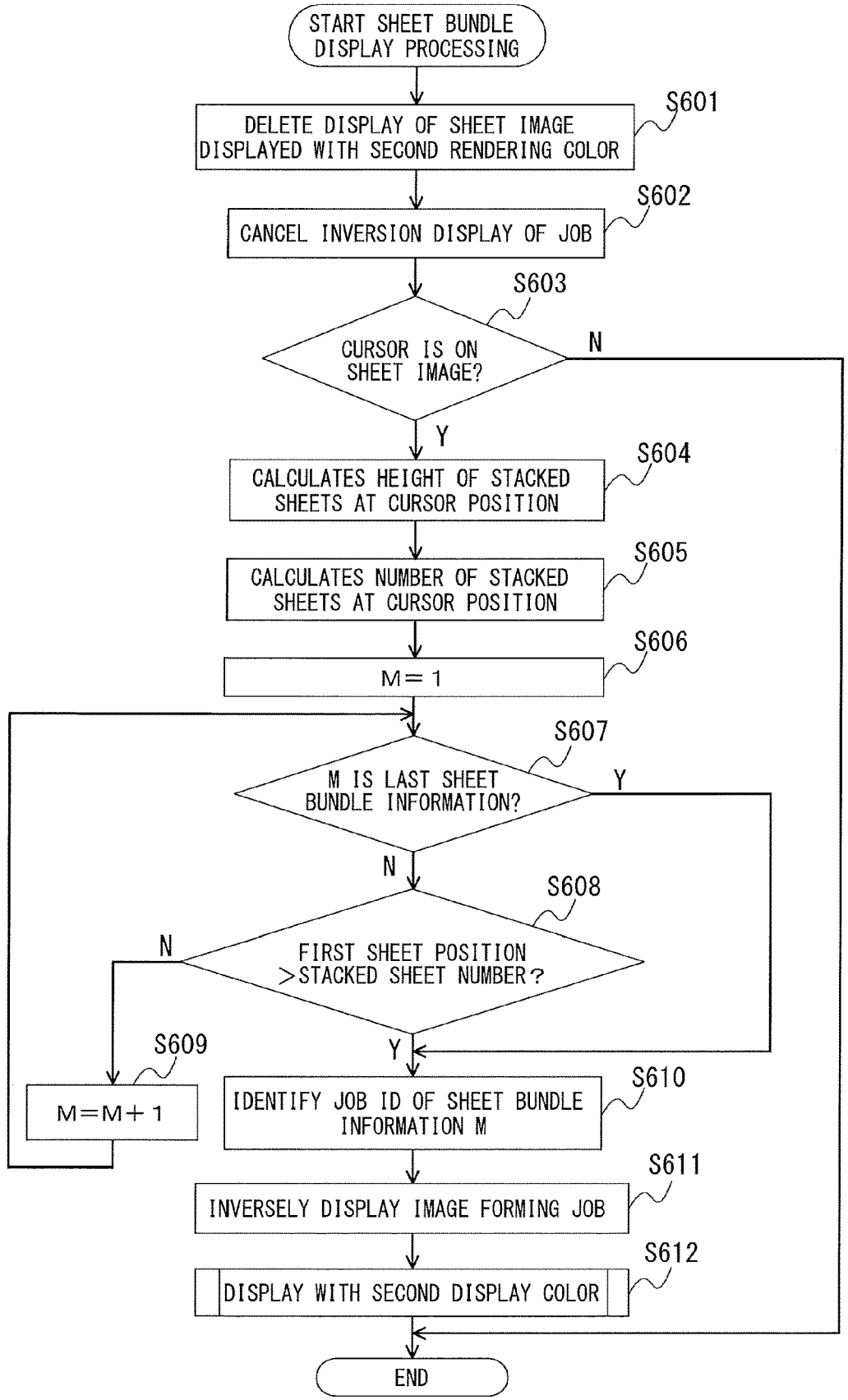
FIG. 14 is a control flow for illustrating another operation procedure of the information processing terminal.

FIG. 14 is a flow for illustrating an operation of the controller 111 at the time when the cursor 1130 is moved or when the display update processing of FIG. 12 is performed to update the sheet image. The controller 111 deletes the display of the sheet image, which is displayed in the second display layer of the image region 1101 with the second rendering color (Step S601). The controller 111 cancels the inversion display (cancels the display mode change) of the image forming job, which is displayed in an inverted manner (changed in display mode) in the processed-job list displayed in the list region 1110, to thereby return the display to normal display (Step S602). After that, the controller 111 determines whether or not the position designated by the cursor 1130 is on the displayed sheet image (Step S603). When the cursor 1130 is on the sheet image, it means that the cursor 1130 is moved by the operator to designate one sheet image. When the cursor 1130 is not on the sheet image (Step S603: N), the series of processing is ended.

Meanwhile, when the cursor 1130 is on the sheet image (Step S603: Y), the controller 111 calculates the height of stacked sheets (r in FIG. 15A) at the position designated by the cursor 1130 in the sheet image (Step S604). The controller 111 next calculates the number of stacked sheets based on the height of stacked sheets calculated in Step S604 (Step S605). The number of stacked sheets is calculated by dividing the height of stacked sheets calculated in Step S604 by the above-mentioned coefficient Q, and is calculated by the controller 111 in this example. When the number of stacked sheets includes a decimal value as a result of calculation, the value may be rounded up to an integer value. After the number of stacked sheets is calculated, the controller 111 substitutes 1 for a variable M representing the order of the sheet bundle information (Step S606). The sheet bundle information M thereafter represents the M-th sheet bundle information in the sheet bundle information list of the tray information corresponding to the sheet image designated by the cursor 1130 of the received stacking state information.

The controller 111 then determines whether or not the sheet bundle information M is the last sheet bundle information in the sheet bundle information list (Step S607). When the sheet bundle information M is the last sheet bundle information (Step S607: Y), the processing proceeds to Step S610. When the sheet bundle information M is not the last sheet bundle information (Step S607: N), the controller 111 determines whether or not the first sheet position of the sheet bundle information subsequent to the sheet bundle information M ((M+1)-th sheet bundle information) is larger than the number of stacked sheets calculated in Step S605 (Step S608). When the first sheet position is equal to or smaller than the number of stacked sheets (Step S608: N), the controller 111 adds 1 to the variable M (Step S609), and the processing returns to Step S607. When the first sheet position is larger than the number of stacked sheets (Step S608: Y), the controller 111 identifies the job ID of the sheet bundle information M (Step S610). After the job ID is identified, the controller 111 displays in an inverted manner the image forming job having the job ID identified in Step S610 in the processed-job list (Step S611). The controller 111 then displays the sheet bundle corresponding to the job ID identified in Step S610 with the second display color (Step S612), and the series of processing is ended. Details of the display processing to be performed in Step S612 are described later.

Figures 15A, 15B, 15C:
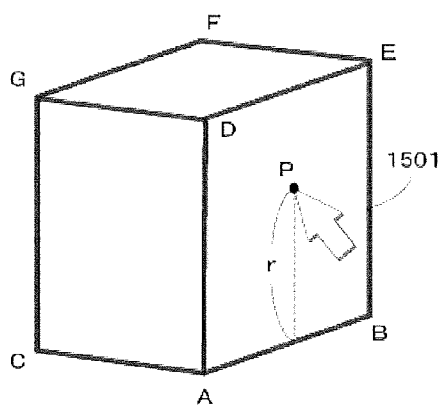
FIG. 15A is an illustration of a sheet image and a cursor.
FIG. 15B is an illustration of a list.
FIG. 15C is an illustration of a calculation expression for calculating a height of stacked sheets.

Now, the method of calculating the height of stacked sheets to be performed in Step S604 is described with reference to FIG. 15A to FIG. 15C. In FIG. 15A, there is illustrated a state in which the cursor is operated by the operator to designate the sheet image (cursor position is on the sheet image). A sheet image 1501 is illustrated. In this case, as an example, similarly to FIG. 13A to FIG. 13C, a sheet image on the ejection tray of the large-capacity stacker is used. P represents a cursor position. In a list 1502 of FIG. 15B, there are shown coordinate values of the vertex A of the sheet image and coordinate values of the cursor position P. In this case, the coordinate values of the vertex A are represented by x, y, and the coordinate values of the cursor position P are represented by Px, Py. At this time, the height of stacked sheets (r in FIG. 15A) at the cursor position P is calculated by a calculation expression 1503 of FIG. 15C. The method of calculating the height of stacked sheets differs depending on the shape of the corresponding sheet image, but the point that the height of stacked sheets is calculated based on the coordinates of the vertices of the sheet image and the coordinates of the position of the cursor is the same.

Figure 16:
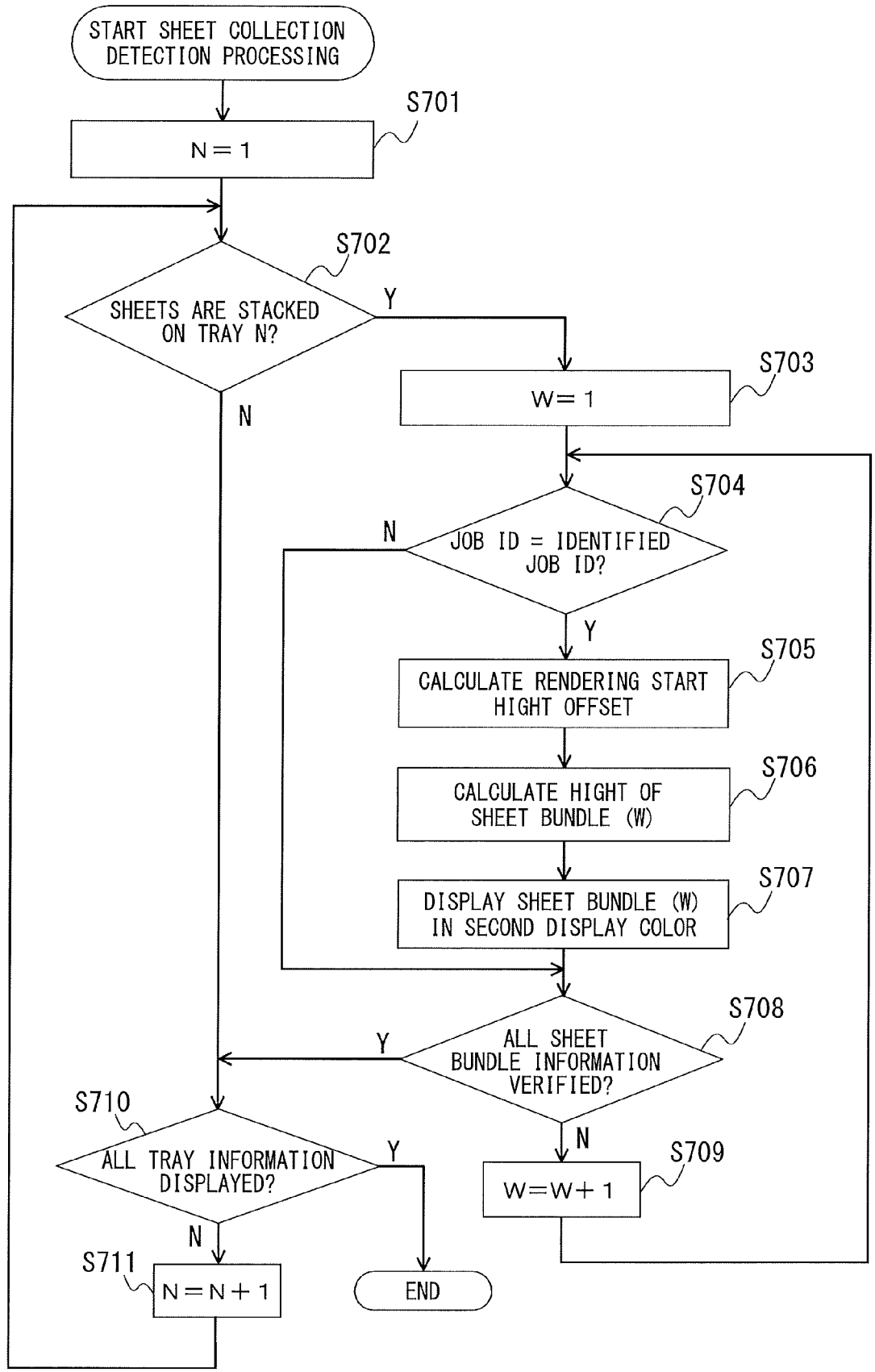
FIG. 16 is a control flow for illustrating further another operation procedure of the information processing terminal.

FIG. 16 is a flow for illustrating details of the operation of the controller 111 in Step S612. In FIG. 16, the controller 111 substitutes 1 for the variable N representing the order of the sheet discharge tray to which the sheets are to be stacked (Step S701), and then determines whether or not the sheets are stacked on the tray N in the stacking state information (Step S702). When the total stacked-sheet number count in the tray information N is 0, it is determined that no sheets are stacked. When no sheets are stacked (Step S702: N), the processing proceeds to Step S710. When the sheets are stacked (Step S702: Y), the controller 111 substitutes 1 for a variable W representing the order of the sheet bundle information (Step S703). The sheet bundle information W thereafter represents the W-th sheet bundle information in the sheet bundle information list of the tray information N of the received stacking state information.

The controller 111 then determines whether or not the job ID of the sheet bundle information W is the same as the job ID identified in Step S610 (Step S704). When the job ID is not the same (Step S704: N), the processing proceeds to Step S708. When the job ID is the same (Step S704: Y), the controller 111 calculates a rendering start height offset (s in FIG. 17A) of the sheet bundle (W) corresponding to the sheet bundle information W (Step S705). The rendering start position height of the sheet bundle (W) is calculated by multiplying the first sheet position of the sheet bundle information W by the above-mentioned coefficient Q. When the rendering start position height includes a decimal value as a result of the calculation, the value is rounded down to an integer value. After that, the controller 111 calculates the height (h2 in FIG. 17A) of the sheet bundle (W) corresponding to the sheet bundle information W (Step S706). That is, the controller 111 calculates the pixel corresponding to the height of the sheet bundle (W) when the sheet image is displayed on the display 113. The height of the sheet bundle (W) is calculated by multiplying the sheet number count by the above-mentioned coefficient Q. When the height of the sheet bundle includes a decimal value as a result of the calculation, the value is rounded up to an integer value.

After the height of the sheet bundle (W) is calculated, the controller 111 displays the sheet image representing the sheet bundle (W) with the second display color, to thereby display the sheet image in an emphasized manner (Step S707). In this manner, the sheet image representing the sheet bundle (W) corresponding to the designated image forming job is displayed in a distinguishable manner. After the sheet image is displayed with the second display color, the controller 111 determines whether or not all pieces of sheet bundle information in the sheet bundle information list of the tray information N have been verified (Step S708). When all pieces of sheet bundle information have been verified (Step S708: Y), the processing proceeds to Step S710. When the verification of all pieces of sheet bundle information is not finished yet (Step S708: N), the controller 111 adds 1 to the variable W (Step S709), and the processing returns to Step S704.

In Step S710, the controller 111 determines whether or not all pieces of tray information in the received sheet discharge state information have been displayed. When the display of all pieces of tray information is finished (Step S710: Y), the series of processing is ended. When the display of all pieces of tray information is not finished yet (Step S710: N), the controller 111 adds 1 to the variable N (Step S711), and the processing returns to Step S702.

Next, a method of rendering the sheet image to be displayed in Step S707 is described with reference to FIG. 17A to FIG. 17C. Description is given of a method of rendering the sheet image on the ejection tray of the large-capacity stacker similarly to FIG. 13A to FIG. 13C. A height (h2 in FIG. 17A) of a sheet image 1701 to be displayed in Step S707 is the height of the sheet bundle calculated in Step S706. The sheet image 1701 is rendered by seven points of a vertex H to a vertex N. In a list 1702 of FIG. 17B, which represents the method of calculating the coordinates of each vertex, the vertex A corresponds to tray position coordinates (coordinate values thereof are expressed as x, y) in the sheet discharge tray.

The vertex H is determined based on the vertex A and the rendering start position height s of the sheet bundle calculated in Step S705. The coordinate values of other vertices (I to N) are determined by adding or subtracting a predetermined offset value and the sheet height h2 to or from the coordinate values of the vertex H. In FIG. 17C, there is shown an example of a rendering command 1703 of the sheet image 1701 at the time when the SVG is used. The shape of the sheet image 1701 differs depending on the shape of the corresponding sheet discharge tray, but the point that the shape is determined based on the tray position coordinates, the predetermined offset value, the rendering start position height of the sheet bundle, and the height of the sheet bundle is the same.

Figure 18:
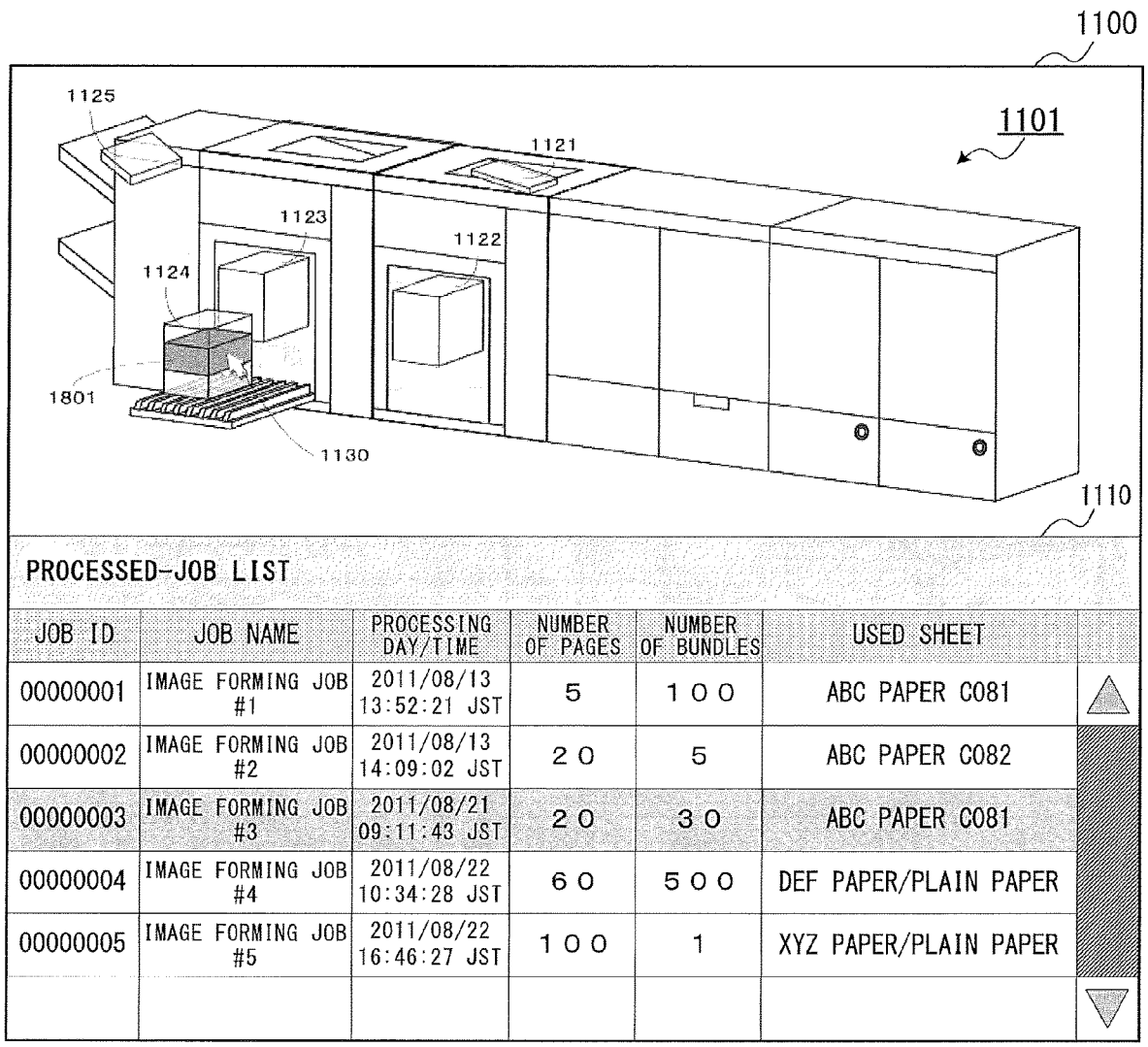
FIG. 18 is a display example of the monitor screen.

FIG. 18 is a schematic diagram for illustrating monitor screen display at the time when the cursor 1130 is moved onto the sheet image in the monitor screen described with reference to FIG. 11 when the operator operates the input portion 114. The sheet stacking state in each sheet discharge tray is similar to that described with reference to FIG. 11. In FIG. 18, the cursor 1130 is moved onto a sheet image 1124. In this manner, the processed job corresponding to the cursor position is identified by the controller 111. In the processed-job list displayed in the list region 1110, the identified processed job is displayed in a display mode that is different from that for other processed jobs so that the identified processed job can be easily distinguished from the other processed jobs. In FIG. 18, the identified processed job is displayed in an inverted manner.

In this case, there is illustrated a state in which a processed job having a job ID of "00000003" (job name: image forming job #3) is identified as the processed job corresponding to the cursor position. A sheet bundle 1801 is a sheet bundle corresponding to the identified processed job, that is, the image forming job #3, and is rendered with the second display color so that the sheet bundle 1801 can be easily distinguished. In the example of FIG. 18, sheets that have been subjected to image processing by a plurality of image forming jobs are stacked on the sheet discharge tray, but sheets that have been subjected to image processing by the same image forming job may be stacked on the sheet discharge tray. In this case, when the cursor is on the sheet image, the image forming job can be uniquely identified regardless of the cursor position on the sheet image. Therefore, in this case, the processing of identifying the job ID of the sheet bundle information M from the height of stacked sheets calculated based on the cursor position height, which is represented in Step S604 to Step S610 of FIG. 14, is not necessarily required to be executed.

As described above, according to the first embodiment, a processed job corresponding to a stacked sheet bundle can be easily identified from the position of the stacked sheet bundle. In this manner, when the operator collects the sheets, the operator can check that the collected sheets correspond to a predetermined processed job. Thus, operation errors in the post-processing step are suppressed, and the convenience is enhanced. In particular, when small-lot and high-variety image formation is performed, it has been difficult to identify the corresponding image forming job from a large amount of stacked sheet bundles discharged to a plurality of locations in a divided manner. According to the first embodiment, the corresponding image forming job can be easily identified even in this case.

Second Embodiment

In the first embodiment, description is given of a mode in which, when the sheet image is designated by the cursor, the processed job corresponding to the cursor position is identified, and the identified processed job is displayed so as to be distinguished from other processed jobs. Meanwhile, when the operator collects the sheet bundle, there is a case in which the operator collects all sheet bundles stacked on the sheet discharge tray instead of collecting only the sheet bundle corresponding to the specific processed job. In this case, the convenience is more enhanced when the operator can check all of the processed jobs corresponding to the sheet bundles stacked on the tray.

In a second embodiment of the present disclosure, when the sheet image is designated by the cursor, processed jobs corresponding to the sheet bundles included in the designated sheet image are identified, and the identified processed jobs are displayed so as to be distinguished from other processed jobs. In the second embodiment, only parts different from those in the first embodiment are described, and the same configuration is described using the same reference symbol. A hardware configuration of a printing system in the second embodiment is similar to that described in the first embodiment.

Figure 19:
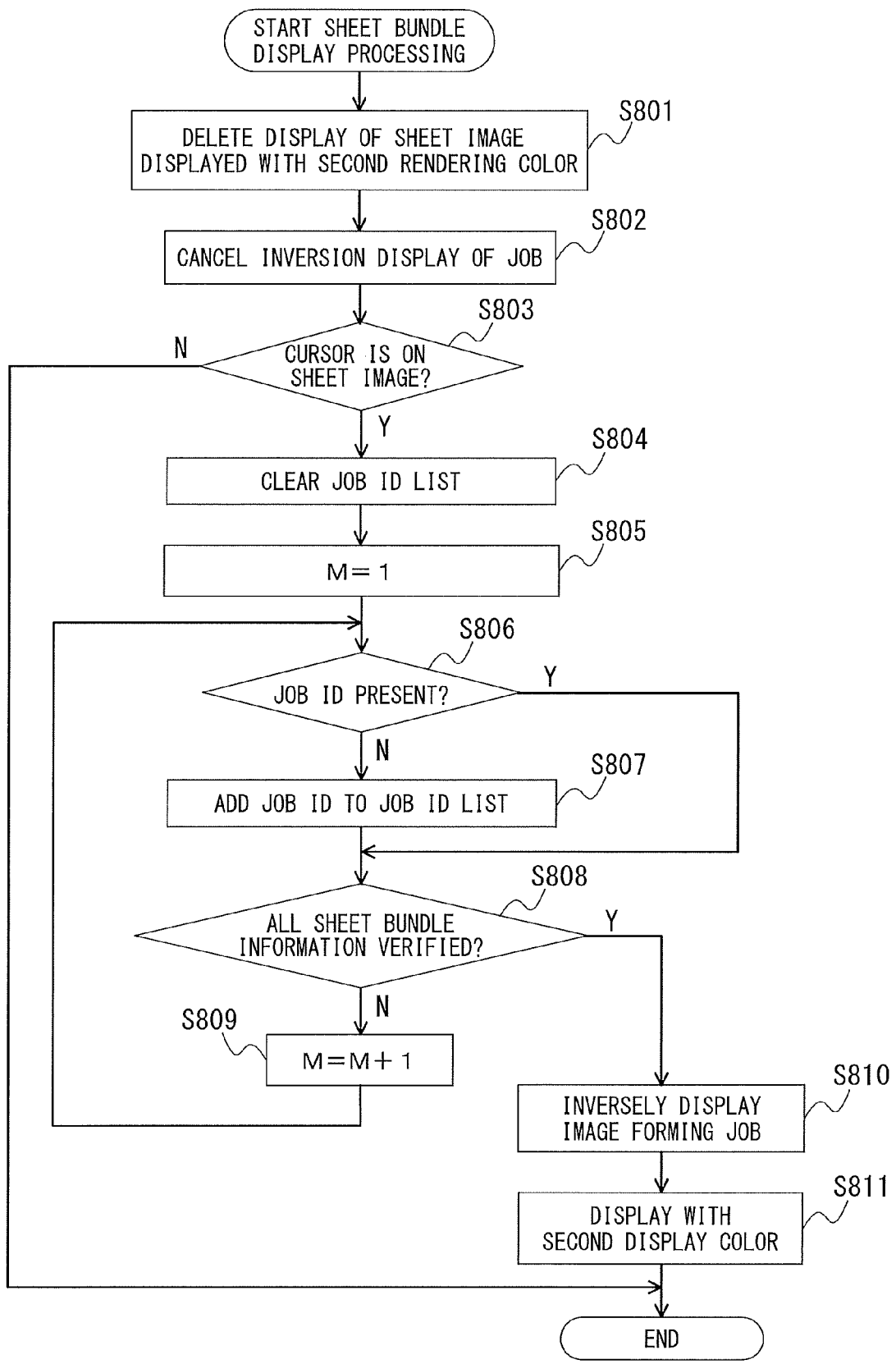
FIG. 19 is a control flow for illustrating yet further another operation procedure of the information processing terminal.

FIG. 19 is a flow for illustrating an operation of the controller 111 at the time when the cursor is moved or when the display update processing in FIG. 12 is performed to update the sheet image in the second embodiment.

In FIG. 19, the controller 111 deletes the display of the sheet image, which is displayed in the second display layer of the image region 1101 with the second rendering color (Step S801). The controller 111 cancels the inversion display of the image forming job, which is displayed in an inverted manner in the processed-job list displayed in the list region 1110, to thereby return the display to normal display (Step S802). After that, the controller 111 determines whether or not the position designated by the cursor 1130 is on the displayed sheet image (Step S803). When the cursor 1130 is on the sheet image, it means that the cursor 1130 is moved by the operator to designate one sheet image. When the cursor 1130 is not on the sheet image (Step S803: N), the series of processing is ended.

Meanwhile, when the cursor 1130 is on the sheet image (Step S803: Y), the controller 111 clears the job ID list. In this case, the job ID list is a list for temporarily storing the job ID of the image forming job corresponding to the designated sheet image, and is stored in, for example, the RAM of the controller 121.

Next, the controller 111 substitutes 1 for the variable M representing the order of the sheet bundle information (Step S805). The sheet bundle information M thereafter represents the M-th sheet bundle information in the sheet bundle information list of the tray information corresponding to the sheet image designated by the cursor 1130 of the received stacking state information. The controller 111 then determines whether or not the job ID of the sheet bundle information M is already present in the job ID list (Step S806). When the job ID is present (Step S806: Y), the controller 111 advances the processing to Step S808. When the job ID is not present (Step S806: N), the controller 111 adds the job ID of the sheet bundle information M to the job ID list (Step S807), and advances the processing to Step S808.

In Step S808, the controller 111 determines whether or not all pieces of sheet bundle information have been verified in the sheet bundle information list of the tray information corresponding to the sheet image designated by the cursor 1130 (Step S808). When all pieces of sheet bundle information have been verified (Step S808: Y), the processing proceeds to Step S810. When the verification of all pieces of sheet bundle information is not finished yet (Step S808: N), the controller 111 adds 1 to the variable M (Step S809), and the processing returns to Step S806. In Step S810, the controller 111 displays in an inverted manner the image forming job having the job ID present in the job ID list in the processed-job list (Step S810). The controller 111 next displays the entire sheet image designated by the cursor 1130 with the second display color (Step S811), and the series of processing is ended.

Figure 20:
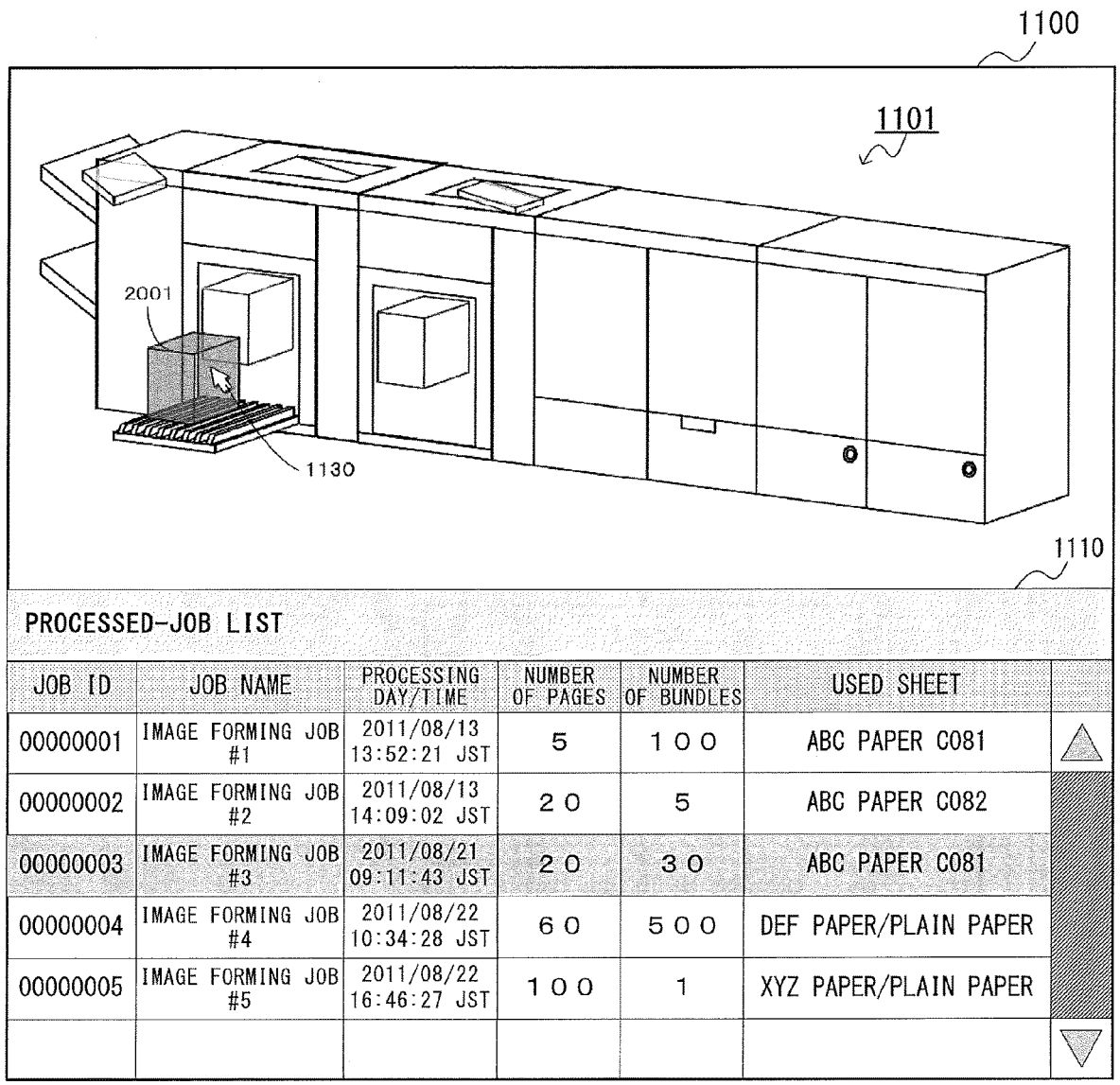
FIG. 20 is a display example of the monitor screen.

FIG. 20 is a schematic diagram for illustrating the monitor screen display at the time when the cursor 1130 is moved onto the sheet image in the monitor screen described with reference to FIG. 11 when the operator operates the input portion 114. The sheet stacking state in each sheet discharge tray is similar to that described with reference to FIG. 11. In FIG. 20, the cursor 1130 is moved onto the sheet image 1124 in FIG. 11, and thus the sheet image designated by the cursor is rendered with the second display color (sheet image 2001). In this manner, all of the processed jobs corresponding to the designated sheet image are identified by the controller 111. In the list region 1110, the identified processed jobs are displayed in an inverted manner so that the identified processed jobs can be easily distinguished from other processed jobs. In this case, there is illustrated a state in which processed jobs having job IDs of "00000001", "00000003", and "00000004" (job names: image forming job #1, image forming job #3, and image forming job #4) are displayed in an inverted manner.

As described above, according to the second embodiment, the processed jobs corresponding to all of the sheet bundles included in the sheet image designated by the cursor can be identified, and the identified processed jobs can be displayed so as to be distinguished from other processed jobs. In this manner, when the operator collects the sheets, the operator can check the image forming jobs corresponding to the collected sheets. As a result, operation errors in the post-processing step are suppressed, and the convenience is enhanced.

Other Exemplary Embodiment

In the first embodiment and the second embodiment, a configuration example in which the information processing terminal 100 and the image forming apparatus 101 are separate members is described, but the image forming apparatus 101 may have the function of the information processing terminal 100. That is, the image forming apparatus 101 may include the storage 112, the display 113, and the input portion 114. In this case, the functions of generating the configuration image and the sheet image are achieved by the controller 121. That is, the controller 121 generates the configuration image and the sheet image, and displays the generated configuration image and the generated sheet image on the display 113. Further, the controller 121 operates as a controller configured to update the display of the sheet image every time the detection result is received from the sheet presence/absence detection sensor 330 or the like.

In such an embodiment, even when the operator is present at a location distant from the image forming apparatus 101, the operator can check that the sheets on the sheet discharge tray correspond to a predetermined image forming job through a mobile processing terminal. Therefore, the operator can correctly collect sheets having images formed thereon by the predetermined image forming job. Further, operation errors in the post-processing step are suppressed, and the convenience is enhanced.

Further, in each of the embodiments, the identified processed job is displayed in an inverted manner so that the identified processed job can be easily distinguished from other processed jobs in the processed-job list, but inversion display is merely an example of the display method. The identified processed job can be displayed in any mode so as to be distinguished from other processed jobs. For example, the job attribute of the identified processed job may be presented to the operator by, for example, pop-up display.

As described above, according to this disclosure, there is provided the image forming apparatus for allowing easy recognition of the image forming job corresponding to the stacked sheets.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-001986, filed Jan. 10, 2018 which is hereby incorporated by reference herein in its entirety.

What is claimed is:

1. An image forming apparatus, comprising:
   an image forming unit configured to form an image on a sheet by executing an input image forming job;
   a plurality of sheet stacking units, on each of which sheets having images formed thereon are to be stacked;
   a memory configured to store first information representing a configuration of the image forming apparatus, and second information including information representing a correspondence between the sheets having the images formed thereon in each of the plurality of sheet stacking units and an image forming job executed for the sheets having the images formed thereon; and
   a controller configured to:
   generate a configuration image by visualizing the configuration based on the first information,
   generate a plurality of sheet images by visualizing a stacking state of the sheets having the images formed thereon in a corresponding one of the plurality of sheet stacking units that is identified based on the second information,
   display, on a display unit, a screen in which the sheet images are mapped at respective sheet stacking positions of the configuration image,
   display a processed job list, which is a list of a plurality of the image forming jobs already performed, receive, via the screen displayed on the display unit, a user instruction for selecting one of the plurality of sheet images, update, in response to the received user instruction, the display of the screen so as to distinguish the selected sheet image from the other sheet images not selected, and update the display of the processed job list so as to distinguish the image forming job corresponding to the selected sheet image that is identified based on the second information from the other image forming jobs in the processed job list.

2. The image forming apparatus according to claim 1, further comprising:
a detector configured to detect a change in the stacking state of the sheets having the images formed thereon; and
a controller configured to update display of the sheet image in accordance with a detection result of the detector.

3. The image forming apparatus according to claim 2, wherein the user instruction includes input for designating a position on the sheet images, and
wherein the controller is configured to identify the image forming job corresponding to the position based on the detection result and the user instruction.

4. The image forming apparatus according to claim 3, wherein the image forming unit is configured to receive input of at least one image forming job to perform image formation on the sheet for each input image forming job, and
wherein, on each of the plurality of sheet stacking units, the sheets having the images formed thereon are to be stacked as a sheet bundle being a bundle of the sheets for each input image forming job.

5. The image forming apparatus according to claim 4, wherein the controller is configured to:
identify the sheet bundle from the designated position;
identify the image forming job corresponding to the identified sheet bundle from the second information; and
display the identified image forming job on the display unit.

6. The image forming apparatus according to claim 5, wherein the controller is configured to arrange image forming jobs, for which discharge of the sheets having the images formed thereon is completed, as processed jobs in a list to display the list on the display unit.

7. The image forming apparatus according to claim 6, wherein the controller is configured to display the image forming job corresponding to the sheet image selected by the user instruction in a display mode different from a display mode for the processed jobs.

8. The image forming apparatus according to claim 5, wherein the controller is configured to:
detect the user instruction;
identify the image forming job corresponding to each sheet bundle included in the configuration image from the second information; and
display each identified image forming job on the display unit.

9. An information processing terminal, comprising:
a communicator configured to communicate with an image forming apparatus including an image forming unit and a plurality of sheet stacking units, on each of which sheets having images formed thereon are to be stacked, the image forming unit being configured to form an image on a sheet by executing an input image forming job;
a memory configured to:
receive, from the image forming apparatus, first information representing a configuration of the image forming apparatus, and second information including information representing a correspondence between the sheets having the images formed thereon in each of the plurality of sheet stacking units and an image forming job executed for the sheets having the images formed thereon, and
store the received first information and the received second information; and
a controller configured to:
generate a configuration image by visualizing the configuration based on the first information,
generate a plurality of sheet images by visualizing a stacking state of the sheets having the images formed thereon in a corresponding one of the plurality of sheet stacking units that is identified based on the second information,
display, on a display unit, a screen in which the sheet images are mapped at respective sheet stacking positions of the configuration image,
display a processed-job list, which is a list of a plurality of the image forming jobs already performed,
receive, via the screen displayed on the display unit, a user instruction for selecting one of the plurality of sheet images,
update, in response to the received user instruction, the display of the screen so as to distinguish the selected sheet image from the other sheet images not selected, and
update the display of the processed-job list so as to distinguish the image forming job corresponding to the selected sheet image that is identified based on the second information from the other image forming jobs in the processed-job list.

10. The information processing terminal according to claim 9,
wherein the display unit includes a first display layer and a second display layer present on the first display layer, and
wherein the controller is configured to display the configuration image in the first display layer and display the sheet image in the second display layer.

11. A non-transitory computer readable storage medium storing a computer program to cause a computer, which is configured to communicate with an image forming apparatus including a plurality of sheet stacking units, on each of which sheets having images formed thereon are to be stacked, and an image forming unit configured to form an image on a sheet by executing an input image forming job, to function as:
a memory configured to:
receive, from the image forming apparatus, first information representing a configuration of the image forming apparatus, and second information including information representing a correspondence between the sheets having the images formed thereon in each of the plurality of sheet stacking units and an image forming job executed for the sheets having the images formed thereon, and
store the received first information and the received second information; and
a controller configured to:

generate a configuration image by visualizing the configuration of the plurality of sheet stacking units based on the first information, generate a plurality of sheet images by visualizing a stacking state of the sheets having the images formed thereon in a corresponding one of the plurality of sheet stacking units that is identified based on the second information, display, on a display unit a screen in which the sheet images are mapped at respective sheet stacking positions of the configuration image, display a processed-job list, which is a list of a plurality of the image forming jobs already performed, receive, via the screen displayed on the display unit, a user instruction for selecting one of the plurality of sheet images, update, in response to the received user instruction, the display of the screen so as to distinguish the selected sheet image from the other sheet images not selected, and update the display of the processed-job list so as to distinguish the image forming job corresponding to the selected sheet image that is identified based on the second information from the other image forming jobs in the processed-job list.

* * * * *